Dec. 11, 1962 P. A. MAXIMOFF ETAL 3,067,902

LUG INSERTER

Filed June 7, 1957 21 Sheets-Sheet 1

INVENTORS.
Paul A. Maximoff
Stanley J. Krol
John B. Sola
By Byron, Hume, Groen & Clement
Attorneys Dec. 11, 1962 P. A. MAXIMOFF ETAL 3,067,902

LUG INSERTER

Filed June 7, 1957 21 Sheets-Sheet 2

INVENTORS.
Paul A. Maximoff
Stanley J. Krol
John B. Sola
By Byron, Hume, Groen & Clement
attorneys

LUG INSERTER

Filed June 7, 1957

21 Sheets-Sheet 3

INVENTORS.
Paul A. Maximoff
Stanley J. Krol
John B. Sola
By Byron, Hume, Groen & Clement
Attorneys INVENTORS.
Paul A. Maximoff
Stanley J. Krol
John B. Sola
By Byron, Hume, Groen & Clement
attorneys INVENTORS.
Paul A. Maximoff
Stanley J. Krol
John B. Sola
By Byron, Hume, Groen & Clement
attorneys INVENTORS.
Paul A. Maximoff
Stanley J. Krol
By John B. Sola
Byron, Hume, Groen & Clement
Attorneys Dec. 11, 1962 P. A. MAXIMOFF ET AL 3,067,902

LUG INSERTER

Filed June 7, 1957 21 Sheets-Sheet 7

INVENTORS.
Paul A. Maximoff
Stanley J. Krol
John B. Sola
By Byron, Hume, Groen & Clement
Attorneys Dec. 11, 1962 P. A. MAXIMOFF ET AL 3,067,902

LUG INSERTER

Filed June 7, 1957 21 Sheets-Sheet 8

INVENTORS.
Paul A. Maximoff
Stanley J. Krol
John B. Sola
By Byron, Hume, Groen & Clement
attorneys

LUG INSERTER

Filed June 7, 1957 21 Sheets-Sheet 9

INVENTORS.
Paul A. Maximoff
Stanley J. Krol
John B. Sola
By Byron, Hume, Groen & Clement
Attorneys INVENTORS.
Paul A. Maximoff
Stanley J. Krol
John B. Sola
By
Byron, Hume, Groen & Clement
Attorneys Dec. 11, 1962 P. A. MAXIMOFF ET AL 3,067,902

LUG INSERTER

Filed June 7, 1957 21 Sheets-Sheet 11

INVENTORS.
Paul A. Maximoff
Stanley J. Krol
John B. Sola
By Byron, Hume, Groen & Clement
Attorneys

LUG INSERTER

Filed June 7, 1957

INVENTORS.
Paul A. Maximoff
Stanley J. Krol
John B. Sola
BY Bryon, Hume, Groen & Clement
attorneys

LUG INSERTER

Filed June 7, 1957 21 Sheets-Sheet 13

INVENTORS.
Paul A. Maximoff
Stanley J. Krol
John B. Sola

By Byron, Hume, Groen & Clement
Attorneys

LUG INSERTER

Filed June 7, 1957

INVENTORS.

Paul A. Maximoff
Stanley J. Krol
John B. Sola

BY Byron, Hume, Groen & Clement
attorneys

LUG INSERTER

Filed June 7, 1957 21 Sheets-Sheet 15

INVENTOR.
Paul A. Maximoff
Stanley J. Krol
John B. Sola
By Byron, Hume, Groen & Clement
attorneys INVENTORS.
Paul A. Maximoff
Stanley J. Krol
John B. Sola
By Byron, Hume, Groen & Clement
attorneys Dec. 11, 1962 P. A. MAXIMOFF ET AL 3,067,902

LUG INSERTER

Filed June 7, 1957 21 Sheets-Sheet 17

INVENTOR.

Paul A. Maximoff
Stanley J. Krol
John B. Sola

BY Byron, Hume, Groen & Clement
attorneys

LUG INSERTER

Filed June 7, 1957 21 Sheets-Sheet 18

INVENTORS.
Paul A. Maximoff
Stanley J. Krol
John B. Sola
By Byron, Hume, Groen & Clement
Attorneys

INVENTORS.

Paul A. Maximoff
Stanley J. Krol
John B. Sola

By Byron, Hume, Groen & Clement
Attorneys

Dec. 11, 1962 P. A. MAXIMOFF ETAL 3,067,902

LUG INSERTER

Filed June 7, 1957 21 Sheets-Sheet 20

INVENTORS.
Paul A. Maximoff
Stanley J. Krol
John B. Sola
By Byron, Hume, Groen & Clement
attorneys Dec. 11, 1962 P. A. MAXIMOFF ETAL 3,067,902

LUG INSERTER

Filed June 7, 1957 21 Sheets-Sheet 21

INVENTOR.
Paul A. Maximoff
Stanley J. Krol
John B. Sola
By Byron, Hume, Groen & Clement
attorneys

United States Patent Office 3,067,902

Patented Dec. 11, 1962

3,067,902

LUG INSERTER

Paul A. Maximoff, West Chicago, Stanley J. Krol, Bensenville, and John B. Sola, Chicago, Ill., assignors to Malco Manufacturing Co., Chicago, Ill., a partnership consisting of Al Just and Margaret R. Just

Filed June 7, 1957, Ser. No. 664,240

23 Claims. (Cl. 218—.5)

This invention relates to automation of assembling machinery. More particularly, the invention relates to machinery utilized for automatic assembling and fastening of flat terminal lugs in printed circuit boards, in preselected patterns and dispositions.

The assembly of flat terminal lugs with printed circuit boards requires not only dispensing of the lugs in a preselected pattern, but, in addition, the lugs must be inserted in a preselected angular disposition and must then be pressed into the boards and permanently secured. The manual performance of these operations has been tedious, slow and expensive.

Recently, a machine has been developed for automatically inserting round, snap-in type terminal pins in printed circuit boards (Paul A. Maximoff, "Apparatus for Dispensing and Mounting Terminal Pins," Serial No. 525,144, filed July 29, 1955, now Patent No. 2,814,802, issued December 3, 1957). However, the insertion and fastening of flat terminal lugs has continued to be a manual operation.

Accordingly, it is an object of the present invention to provide a machine for automatically placing and securing terminal lugs in the base boards of printed circuits.

Another object of the invention is to provide automatic lug inserter machines embodying improved mechanism for feeding the lugs into the machine.

A further object of the invention is to provide an automatic lug inserting machine embodying improved means for orientating and dispensing flat terminal lugs with respect to mating apertures in printed circuit boards.

An additional object of the invention is to provide an automatic lug inserter machine utilizing improved mechanism for co-ordinating printed circuit board handling with lug insertion and fastening.

Still another object of the invention is to provide an automatic lug inserter machine embodying improved means for storing and dispensing printed circuit boards.

A still further object of the invention is to provide an automatic lug inserter machine including improved mechanism for shifting printed circuit boards between operative stations in the machine.

Another object of the invention is to provide an automatic lug inserter machine including improved mechanism for repositioning printed circuit boards having lugs fastened thereto.

An important object of the invention is to provide an improved automatic lug inserter machine for achieving rapid automation of successive complete cycles of handling of printed circuit boards and terminal lugs including storage and dispensing of boards and lugs, disposal of lugs in fixed position in a preselected pattern in the boards, and subsequent repositioning of finished boards for further operations.

Other objects, features and advantages will be apparent from the following detailed description taken in conjunction with the accompanying drawings, in which.

Figures 50, 51, 52, 53, 54, 55, 56, 57:
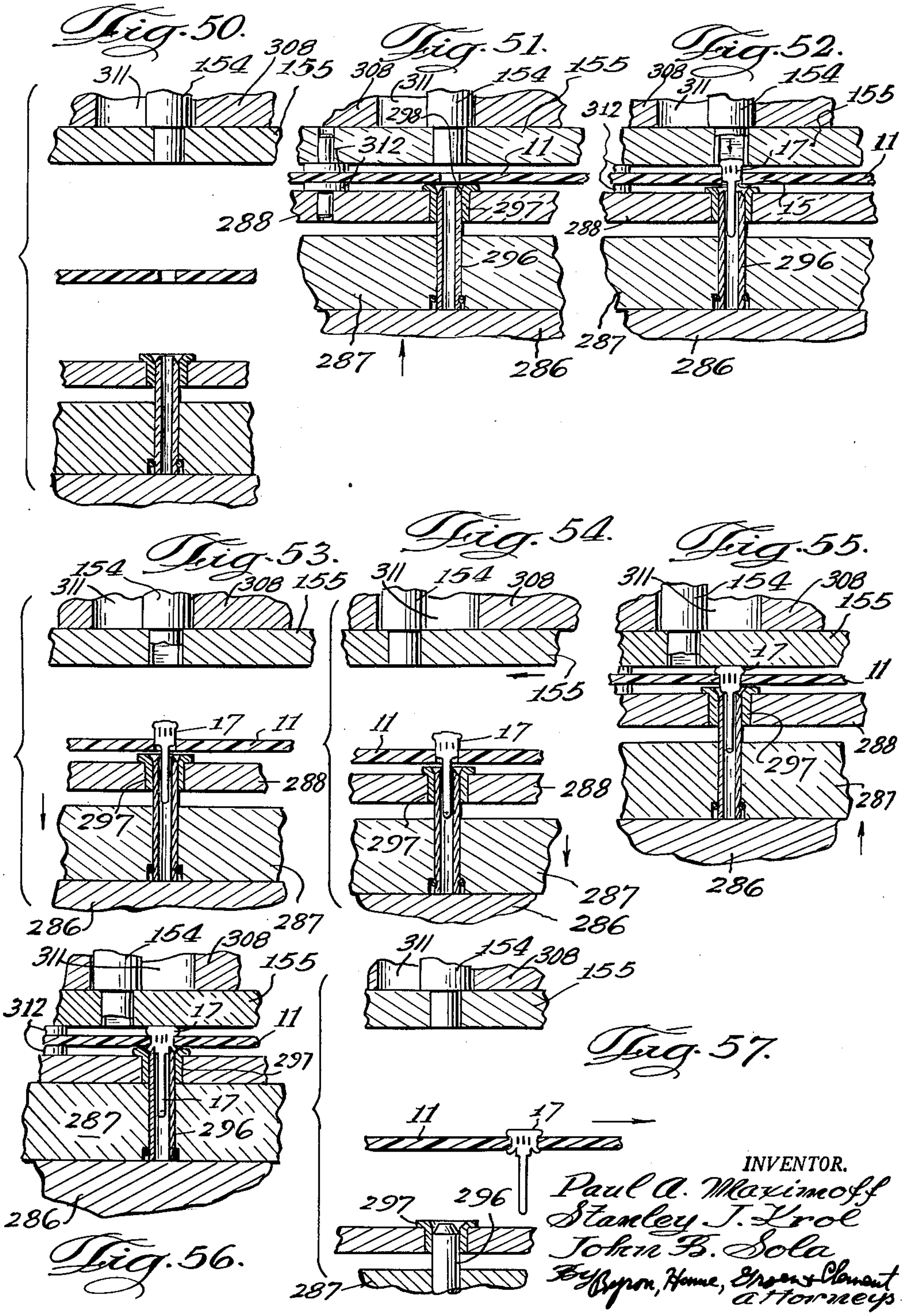
FIGURE 50 is a fragmentary sectional view showing the relationship between the shuttle plate, an orientating bushing, the printed circuit board, a staking bushing, and the board receiving assembly, before the orientating and staking cycle is begun.
FIGURE 51 is a fragmentary sectional view similar to FIGURE 50 but showing the next sequence with the board receiving mechanism moved upward to clamp the board against the shuttle plate with the orientating bushing aligned with a terminal lug aperture in the board.
FIGURE 52 is a fragmentary section view similar to FIGURE 51 but showing the next sequence with a terminal lug dropped into place in the aperture in the printed circuit board.
FIGURE 53 is a fragmentary sectional view similar to FIGURE 52 but showing the next sequence with the shuttle plate raised.
FIGURE 54 is a fragmentary sectional view similar to FIGURE 53 but showing the next sequence with the shuttle plate shifted to one side to move the orientating bushing out of alignment with the loosely disposed terminal lug.
FIGURE 55 is a fragmentary sectional view similar to FIGURE 54 but showing the next sequence with board receiving assembly moved upward to press the lug into place in the aperture in the printed circuit board, before staking.

FIGURE 56 is a fragmentary sectional view similar to FIGURE 55, but showing the parts a fraction of a second afterwards when the staking bushing has moved upwardly to stake the terminal lug in the board; and FIGURE 57 is a fragmentary sectional view showing the sequence after FIGURE 56 where the terminal board with staked lugs is being removed to the next position and to make room for another printed circuit board.

The lug inserter machine of this invention provides complete automation in the handling of printed circuit boards and the dispensing of terminal lugs into apertures in the boards. The machine includes a plurality of major assemblies working in timed sequence for handling boards, inserting lugs in the boards, pressing the lugs into place, permanently staking the lugs, and repositioning the finished boards for subsequent operations. The entire cycle per board requires about three seconds.

Figure 1:
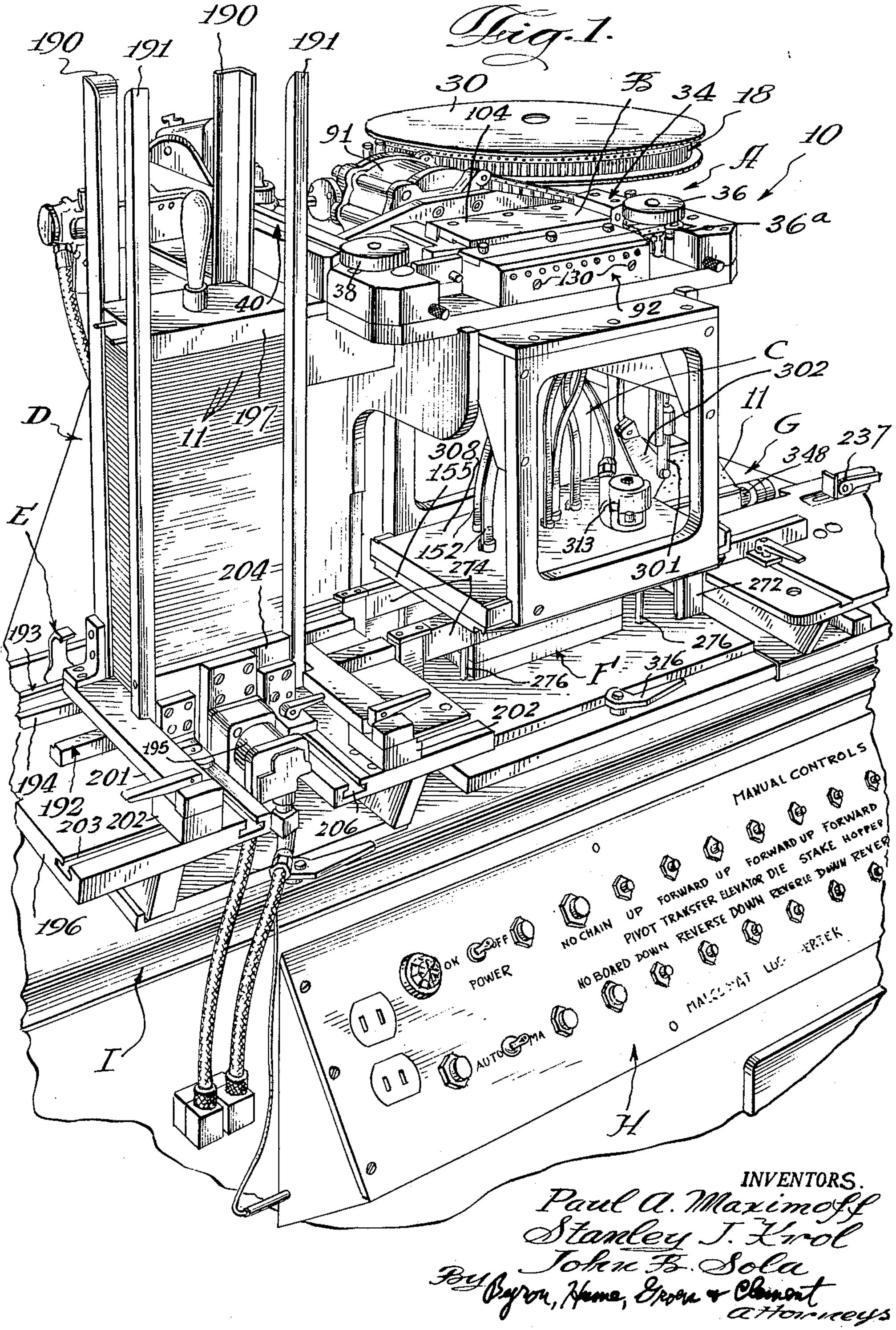
FIGURE 1 is a perspective front view of the lug inserter machine according to the present invention, showing the left side of the machine.
Figure 2:
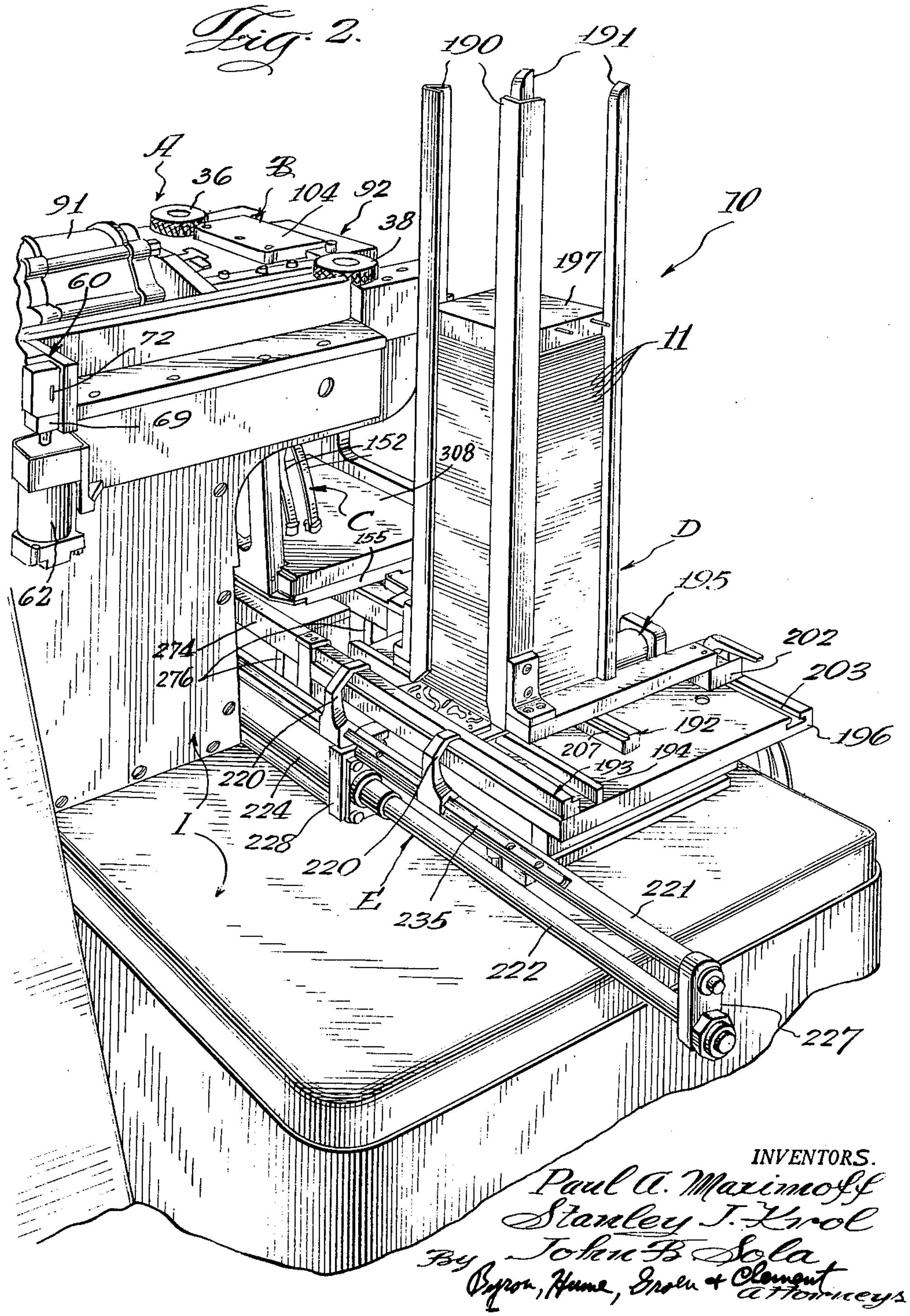
FIGURE 2 is a perspective left side view of the lug inserter machine, showing a portion of the rear of the machine.
Figure 3:
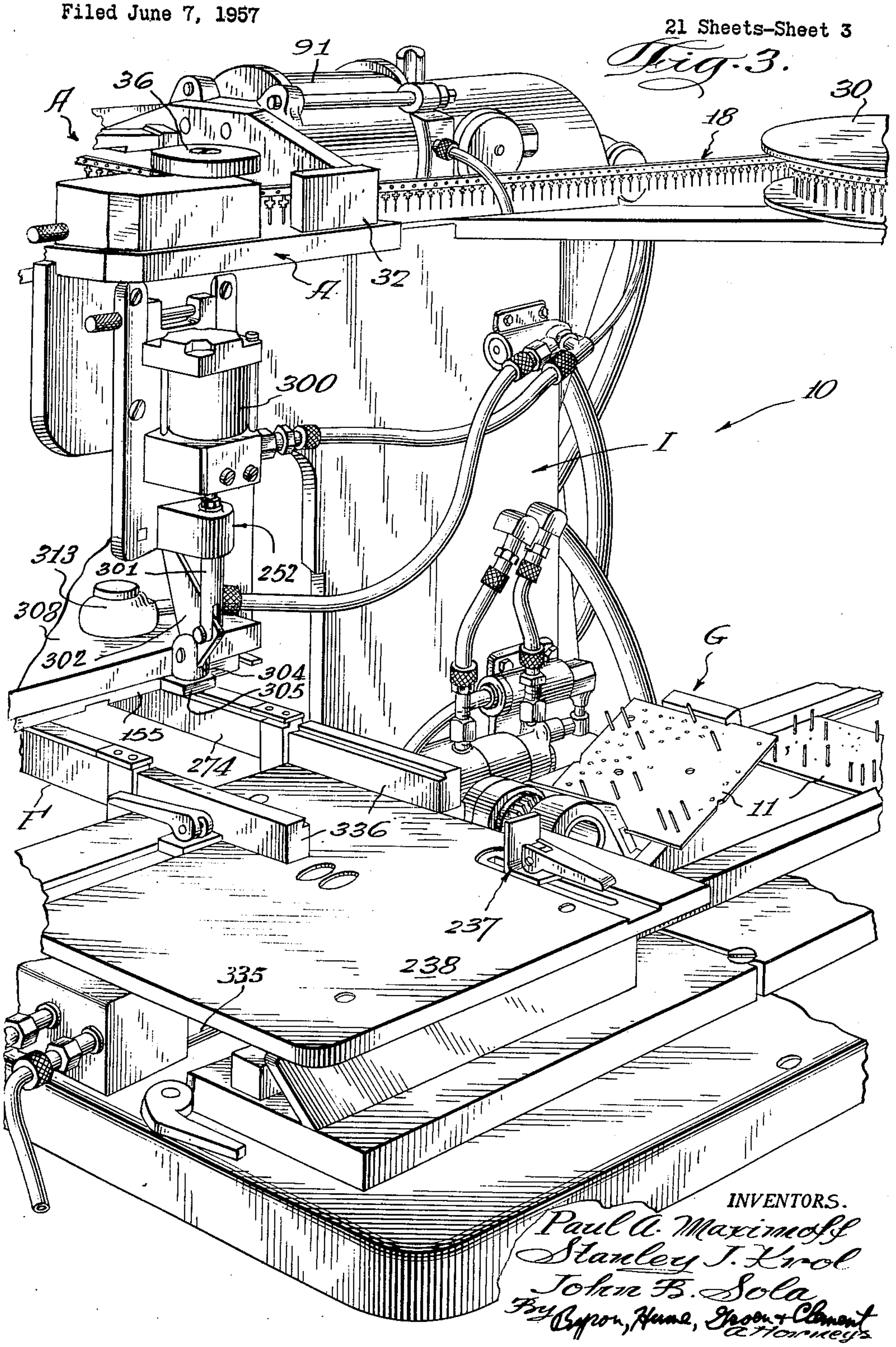
FIGURE 3 is a perspective front view of the machine, showing the right side.
Figures 4, 5:
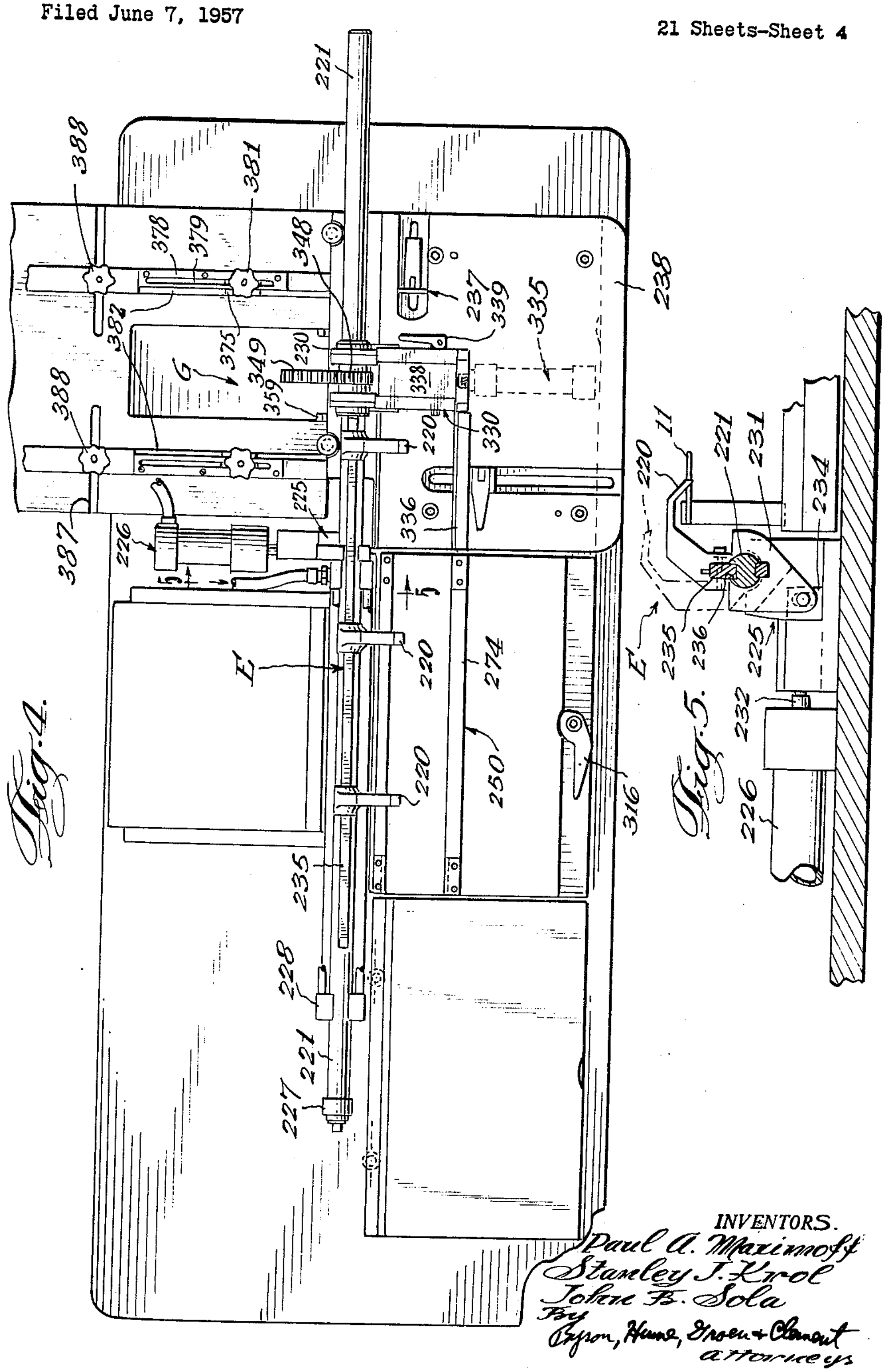
FIGURE 4 is a top plan view of the printed circuit board transfer and repositioning assemblies.
FIGURE 5 is a fragmentary sectional view taken along line 5—5 of FIGURE 4.

Referring to FIGURES 1–3 of the drawings, the complete lug inserter machine is generally designated by the reference numeral 10. The major assemblies, which operate in timed sequence, are the terminal lug feeding assembly A, the lug severing assembly B, the lug orientating assembly C, the printed circuit board dispensing or "stacker" assembly D, the board transfer assembly E, the board receiving assembly F, and the board repositioning or flip-over assembly G. Timed sequence of operation of the various major assemblies is accomplished through control apparatus H (only the control board being shown) of any suitable construction. The control apparatus enters into the present invention only insofar as it controls and co-ordinates the sequence of the major assemblies. The various major assemblies are mounted on a stationary machine frame, generally designated by the reference letter I and including a number of support members, base plates, side plates, etc.

Figure 45:
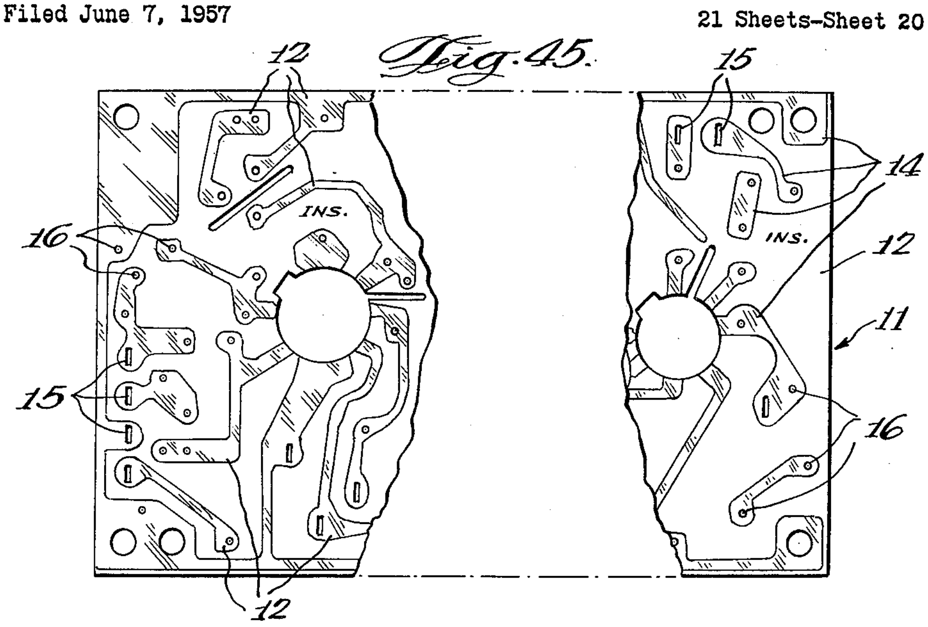
FIGURE 45 is a fragmentary plan view of a typical printed circuit board.
Figure 46:
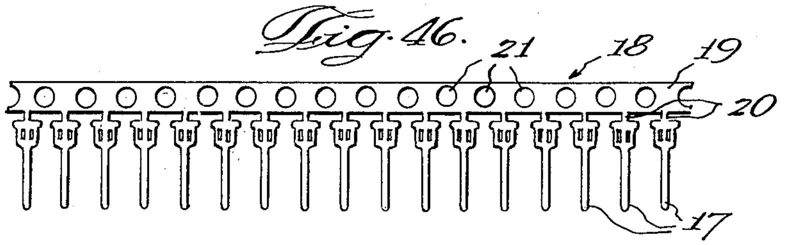
FIGURE 46 is a side elevational view of a portion of a chian or flexible strip with a plurality of terminal lugs integrally secured thereto.
Figures 47, 48, 49:
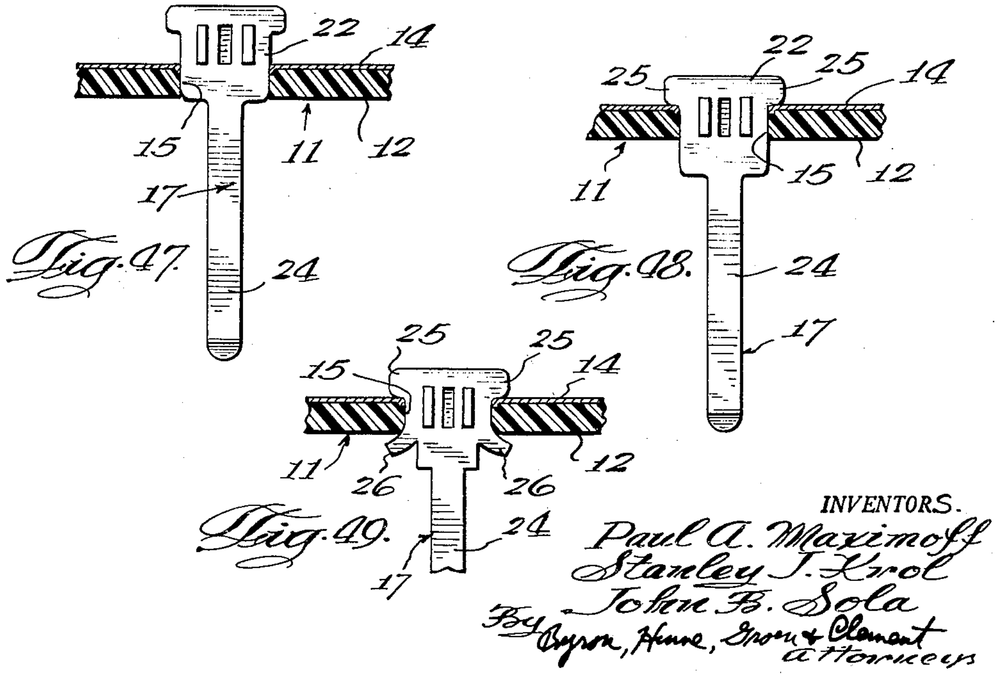
FIGURE 47 is an enlarged fragmentary sectional view of a portion of a printed circuit board having a terminal lug disposed in an aperture thereof in position before being pressed into place.
FIGURE 48 is an enlarged fragmentary sectional view similar to FIGURE 47 but showing the terminal lug pressed into the board.
FIGURE 49 is an enlarged fragmentary sectional view similar to FIGURE 48 but showing the terminal lug permanently staked in the printed circuit board.

A typical printed circuit board 11 is illustrated in FIGURE 45. The board includes an insulating base 12 of fairly rigid electrical insulating material having a plurality of electrical conducting areas 14 secured in any desired pattern on one face of the insulating base (see also FIGURES 47–49). The areas of conducting material 14 provide the "printed circuits." The printed circuit boards 11 are provided with a plurality of rectangular apertures 15 and a plurality of circular apertures 16. The apertures are formed through the conducting areas and through the insulating base, and they provide means for attaching conductors. The apertures may be of various sizes for receiving terminal pins or lugs of various types, or for receiving prongs of electronic tubes, or the like.

The machine of the present invention is particularly well adapted for inserting and fixedly securing flat terminal lugs 17 (FIGS. 46–49) into rectangular openings 15 in a printed circuit board 11. The flat terminal lugs 17 are preferably integrally formed on a flexible metal ribbon 18, which is usually referred to as a "chain." In addition to the lugs, the chain includes a flexible metal indexing strip 19 to which the lugs are secured by means of respective integral tabs 20 with the lugs extending laterally from one edge of the indexing strip 19 in equally spaced relation as shown. A plurality of indexing apertures 21 are formed through the indexing strip at intervals equal to the spacing of the terminal lugs for use in feeding and indexing the chain through the machine.

The terminal lugs themselves each include a head portion 22 and a shank portion 24. The lugs are adapted for being firmly pressed into and seated in the apertures 15, with a pair of ears 25 formed on the head bearing against the conducting areas 14. In order to permanently stake the lugs in the apertures, side portions of the head below the insulated base are split from the central portion and forced outwardly to provide staking tabs 26. The terminal lugs are described in detail in the copending application of Ronald S. Narozny, Serial No. 592,895, filed June 21, 1956, now Patent No. 2,811,702, issued October 29, 1957.

The machine of the present invention is directed to the problem of complete automation of assembly of the flat terminal lugs 17 with printed circuit boards 11, including terminal lug feeding, severing and dispensing, and feeding and subsequent handling of the printed circuit boards.

*Terminal Lug Feeding Assembly*

Figure 6:
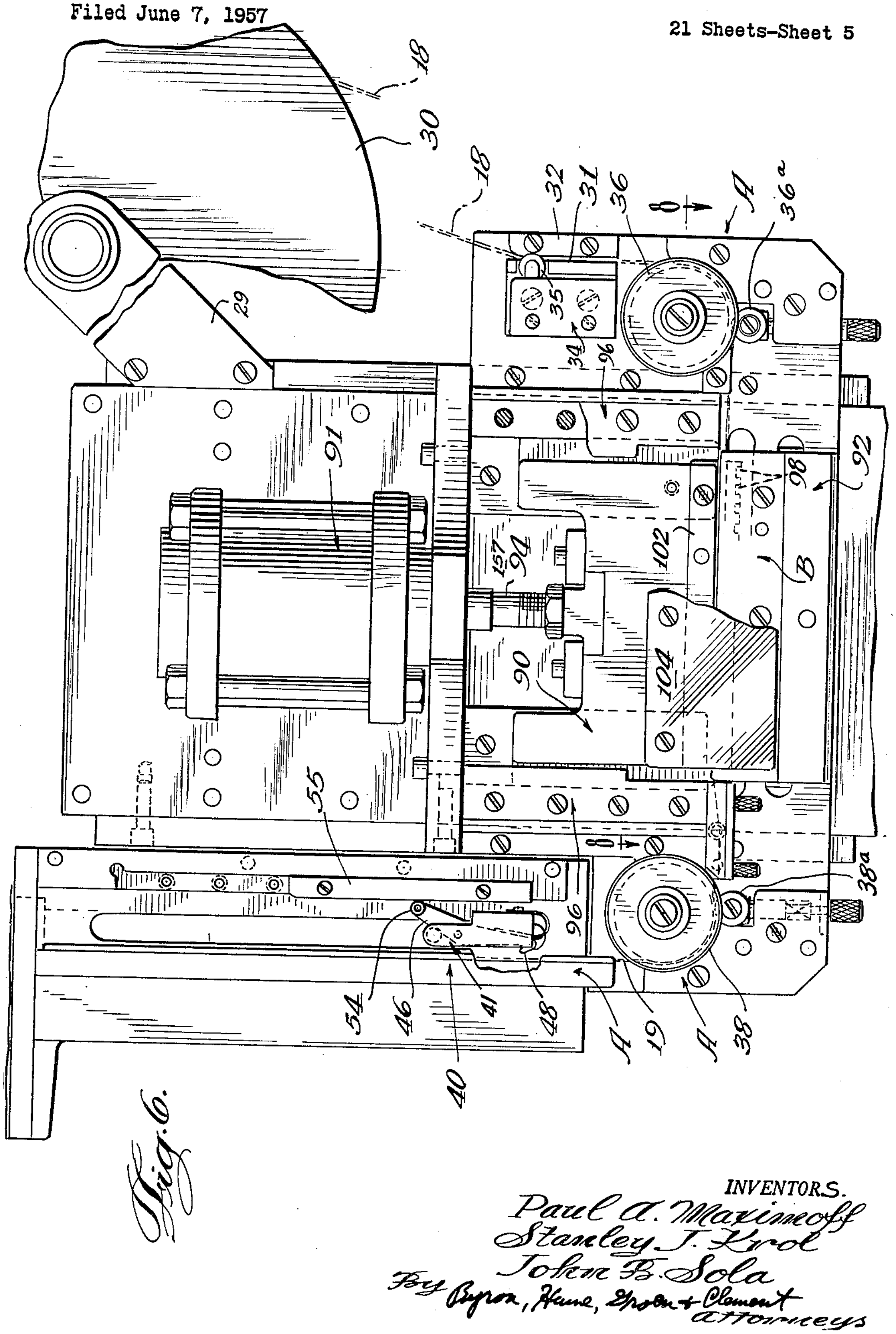
FIGURE 6 is a fragmentary top view of the terminal lug feeding and severing assemblies, with parts broken away.
Figures 7, 8:
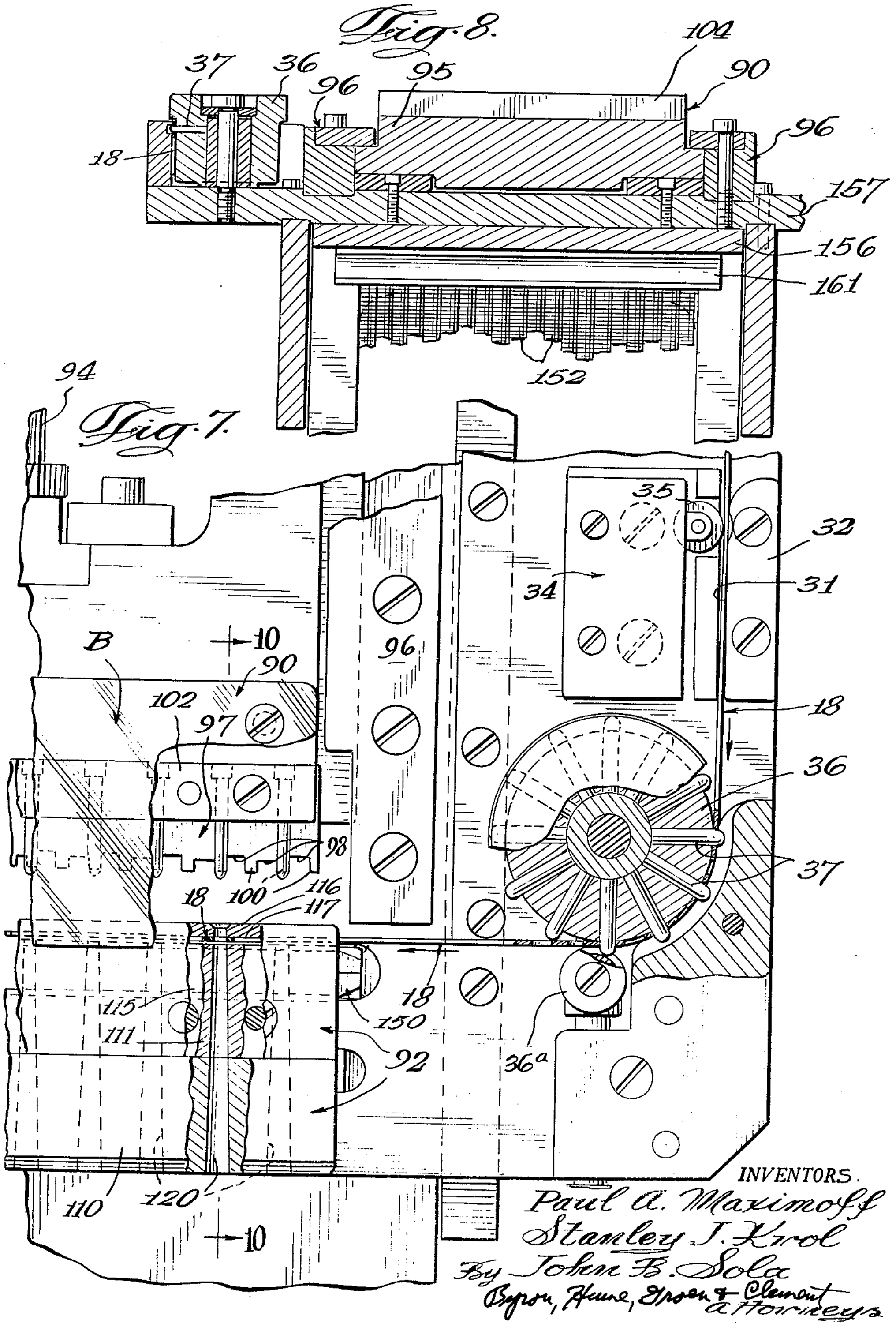
FIGURE 7 is an enlarged fragmentary top view of portions of the terminal lug feeding and severing assemblies, with parts broken away.
FIGURE 8 is a fragmentary sectional view taken along line 8—8 of FIGURE 6.

The lug feeding assembly A is generally shown in FIGURES 1 and 3 and is specifically illustrated in FIGURES 6–8 and 10–14. A reel 30 is rotatably mounted for rotation about a vertical axis on a bracket 29 which is fixedly secured to the frame of the machine, and the terminal lug chain 18 is coiled about the reel with the lugs hanging vertically downwardly. The reel 30 is mounted on a bearing having sufficient friction to overcome its inertia when the tension on the chain is suddenly released so that the chain can be intermittently stripped from the reel without overfeeding. The chain is fed into a guide channel 31 formed between a block 32 and a switch assembly 34. The switch assembly includes a micro-switch feeler roller 35 which is associated with the control apparatus H. The roller engages the chain and is held in a switch actuating position as seen in FIG. 7 when the chain is present. When the chain is ended or broken, the roller moves to its switch deactivating position as seen in FIGURE 6 to halt automatic operation of the machine and to indicate the absence of the chain to the operator.

The chain 18 is then fed around a guide spool 36 which is secured to the machine frame for rotation about a vertical axis. The spool 36 is provided with a plurality of radiating spokes 37 which engage in the indexing apertures 21 to accurately locate the chain vertically. As best illustrated in FIGURE 7, the chain turns approximately 90° about the spool 36. A spring-pressed roller *36a* engages the chain as shown to hold it against the spool and to assist in guiding it around the spool.

Thereafter, the chain is fed through the severing assembly B wherein the terminal lugs 17 are severed from the indexing strip 19 in a manner to be described in detail.

After the terminal lugs are severed, the remaining indexing strip 19 is fed about a second guide spool 38 on the opposite side of the severing assembly. The spool 38 may be constructed and rotatably secured in the same manner as the spool 36, so that the indexing strip is maintained at its proper height in the machine and is again turned approximately 90°. A second spring pressed roller *38a* presses the chain against the spool 38. The two rollers *36a* and *38a* act in conjunction to keep the chain evenly stretched between the spools 36 and 38.

Figures 12, 13, 14:
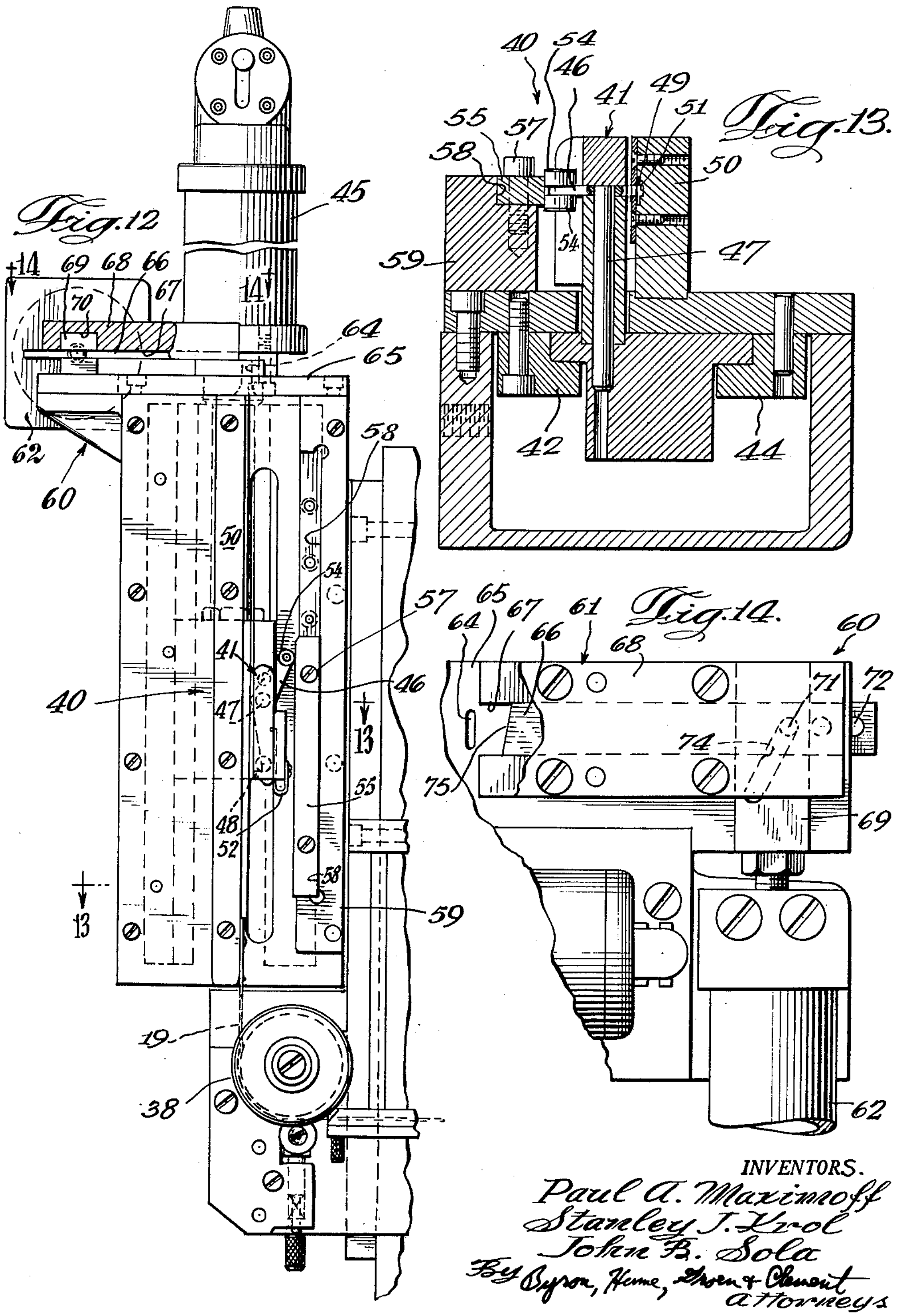
FIGURE 12 is an enlarged fragmentary top view of the left side of the terminal lug feed assembly.
FIGURE 13 is a sectional view taken along line 13—13 of FIGURE 12.
FIGURE 14 is a fragmentary elevational view taken along line 14—14 of FIGURE 12.

The flexible strip 19 leaving the second spool 38 is led to chain feed drive mechanism, generally indicated by the reference numeral 40, best illustrated in FIGURES 6, 12 and 13. The chain drive mechanism includes a pawl assembly 41 which is shiftably mounted to the machine frame by slideways 42 and 44. The pawl assembly is intermittently shifted by a double acting pneumatic cylinder 45 through a piston (not shown) which is connected to the pawl assembly in any suitable manner (not shown).

For intermittently pulling the flexible strip 19 to feed the chain 18 a predetermined distance with each reciprocation of the drive slide assembly, a drive pawl 46 (FIGURES 6, 12 and 13) is pivotally mounted on a vertically disposed pin 47 secured to the pawl assembly. The drive pawl is provided with an integral ratchet tooth 48 at one end which is of proper size for engaging the holes 21 of the flexible strip.

A strip feed groove 49 is formed in a strip receiver block 50 secured to the machine frame adjacent the slide feed assembly, and a clearance channel 51 is formed in the feed groove to provide clearance for the end of the ratchet tooth 48 when it extends through one of the indexing holes 21 in the flexible strip. The ratchet tooth is shaped that it will pull on the strip when the pawl assembly is moved rearwardly. However, the forward edge of the tooth is slanted so that it will disengage from the indexing apertures and slide over the strip when the pawl assembly is moved forwardly.

In order to resiliently bias the pawl 46 so that the tooth 48 is urged into engagement in one of the indexing apertures in the flexible strip, a suitable flat spring 52 is carried by the pawl assembly and resiliently engages the pawl. At the opposite end of the pawl, on the other side of the pivot pin 47, a cam roller 54 is rotatably secured. The cam roller rides on feed bar 55. The feed bar is removably secured, by means of screws 57, in a longitudinal groove 58 formed in a block 59 which is secured to the machine frame, adjacent the pawl assembly 41 on the opposite side from the receiver block 50.

The spring 52 causes the roller 54 to roll against the marginal edges of either the feed bar 55 or the block 59. The feed bar 55 is wider than the groove 58, so that when the roller engages the feed bar 55, the pawl tooth 48 is held away from the flexible strip 19. When the roller 54 engages the edge of the block 59 to the rear of the feed bar 55, the pawl tooth 48 is permitted to engage in one of the indexing apertures 21 in the flexible strip.

As the pawl assembly 41 is moved rearwardly by the cylinder 45, the tooth 48 is held from engagement with the flexible strip as long as the roller 54 is rolling along the marginal edge of the feed bar 55. As the roller moves beyond the feed bar 55, the pawl engages in one of the indexing holes in the flexible strip. Consequently, as the pawl assembly continues its rearward movement, a portion of the chain 18 is pulled from the reel, through the guide channel 31, around the first spool 36, through the severing assembly B, and around the second spool 38. The length of chain which is pulled with each rearward movement of the slide assembly 41 depends upon the length of the feed bar 55. The feed bar is provided in different lengths, so that the machine will feed any desired number of terminal lugs, from one lug to the maximum number permitted by the full throw of the slide feed assembly.

The chain feed drive mechanism 40 is actuated by the control apparatus H in timed sequence with the operation of the severing assembly B. The feed mechanism pulls the chain to feed a selected number of terminal lugs into the severing assembly where they are severed from the flexible strip. This sequence is repeated as long as the machine is in operation.

A scrap cutter mechanism 60 (FIGURES 12 and 14) is provided immediately following the rearmost position of the pawl assembly and includes a cutter block assembly 61 and a double-throw actuating cylinder 62. As the pawl assembly 41 feeds the strip 19 rearwardly, the end portion of the strip extends through a feed aperture 64 through a back plate 65. A knife or cutter member 66 is slidably disposed in a groove 67 formed in a cutter holder block 68. The piston (not shown) of the cylinder 62 is connected to an actuating block 69 which is received in a vertical groove 70 in the cutter support member 68. The upper end of the actuating block 69 is bifurcated and is engaged about a portion of the knife 66. A pin 71 is secured transversely in one of a plurality of longitudinally spaced apertures 72 formed at the rearward end of the knife, and the ends of the pin 71 are disposed in a pair of opposed diagonal grooves 74 formed in the respective bifurcated halves of the upper end of the actuating block 69.

When the cylinder 62 is actuated to cause the actuating block 49 to move upwardly, the knife 66 moves toward the left as seen in FIGURE 14, or toward the right as seen in FIGURE 12. A slanted cutting edge 75 formed on the forward end of the knife 66 is moved across the feed aperture 64 to cut off the portion of the flexible strip 19 extending rearwardly beyond the plate 65. The cutter mechanism 60 is actuated by the control apparatus H to work in timed sequence with the slide feeder mechanism. After each chain feeding stroke of the pawl assembly, the cutter mechanism is actuated to cut off the end of the flexible strip. The short lengths of the strip can be readily collected as scrap.

*Terminal Lug Severing Assembly*

The severing assembly B is generally shown in FIG-

URES 1 and 2 and specifically illustrated in FIGURES 6, 7, 8, 10, 11 and 15. The assembly includes a severing slide mechanism 90, a double-throw pneumatic actuating cylinder 91, and a chain holder mechanism 92.

The actuating cylinder 91 includes a piston (not shown) connected to a rod 94 which, in turn, is adjustably connected to a slide block 95 of the severing slide mechanism. The slide block is shiftably secured to the machine frame by means of a pair of slideway assemblies 96, 96.

Figures 10, 11:
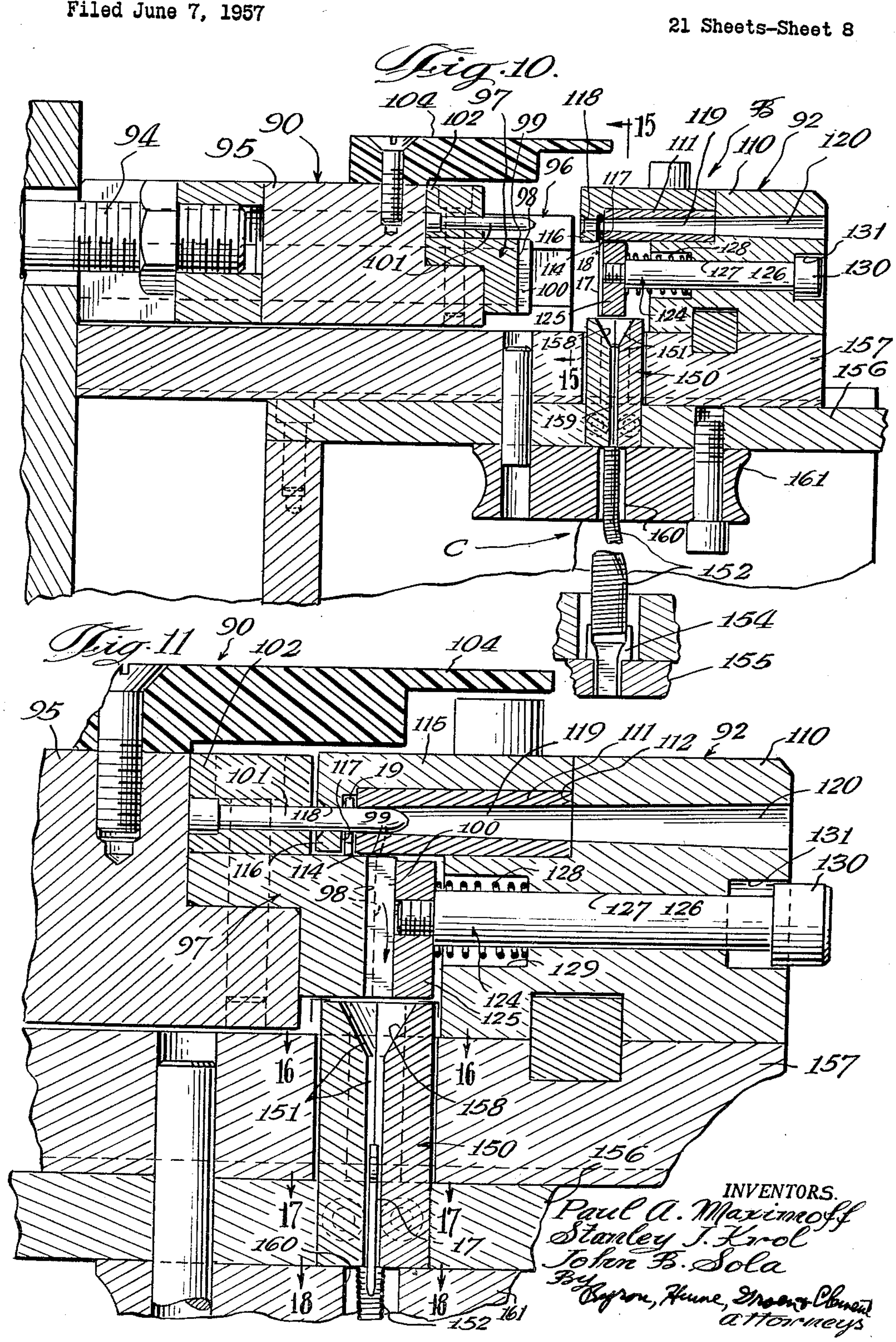
FIGURE 10 is a fragmentary sectional view taken along line 10—10 of FIGURE 7.
FIGURE 11 is a fragmentary sectional view similar to FIGURE 10 but on an enlarged scale and showing the severing blade in the forward position after a severing operation.

A hardened steel shear blade 97 is fixedly mounted on the forward end portion of the slide block 95 and is provided with a plurality of vertical cutting faces 98, each forming an upper cutting or shearing edge 99 at its juncture with the upper face of the cutting blade 97. The cutting faces 98 are alternately staggered in a fore and aft direction, as illustrated in FIGURES 7 and 11. Vertical lands 100 are formed between the cutting faces 98 and extend forwardly of the cutting faces. The lands end in a common plane which is parallel to the cutting faces. The spacing of the cutting faces 98 corresponds to the spacing of the terminal lugs 17 on the chain 18.

A plurality of guide pins 101 are disposed above the blade 97 and are fixedly secured in horizontal position to the slide block 95 by means of a fixedly secured keeper bar 102. The pins 101 are spaced above every other land 100, so that they correspond to the spacing of the indexing apertures 21 in the flexible strip 19 of the chain.

The severing slide mechanism is completed by a transparent plastic safety guard 104 which is fixedly secured to the slide block 95. The safety guard covers the gap between the slide assembly and the chain holder mechanism to prevent foreign matter from dropping between the two mechanisms while still permitting the operator to see therebetween.

The chain holder mechanism 92 includes a support block 110 having a hardened steel cutter anvil 111 secured in a groove 112 formed along the upper rearward edge of the block. The anvil provides a rearward lower cutting edge 114 which co-acts with the staggered cutting edges 99 of the severing blade 97 to sever the terminal lugs 17 from the chain 18 when the severing slide mechanism is moved forward from the position of FIGURE 10 to the position of FIGURE 11. Because of the staggered formation of the cutting edges 99, the blade severs only half of the terminal lugs at a time, thus reducing the power required and lessening the shock on the machine parts.

A chain guide block 115 is fixedly secured over the cutter anvil 111 and has a rearward marginal portion 116 which overhangs the rearward end of the anvil to provide a chain guide space 117. The overhanging lip 116 has a plurality of horizontal apertures 118 formed therethrough in alignment with the respective guide pins 101, and the cutter anvil 111 and the support block 110 are formed with correspondingly aligned, forwardly flaring tapered apertures 119 and 120, respectively. The forward ends of the guide pins 110 are rounded as shown to accommodate possible misalignment of the indexing apertures 21 in the chain with respect to the apertures 118 and 119. The pins exactly align the chain 18 by engaging in the close fitting apertures 21 formed in the chain immediately prior to severance of the terminal lugs 17. This insures that the terminal lugs are exactly positioned when they are severed.

A pressure plate assembly 124 is provided for maintaining the vertical disposition of the terminal lugs before they are severed and as they are dropped. The pressure plate assembly includes a pressure plate 125 which is fixedly secured at the ends of a plurality of guide bolts 126. The guide bolts 126 are slidably disposed in apertures 127 formed in the support block 110. Compression springs 128 act between the pressure plate 125 and the blind ends of a plurality of rearward countersunk bores 129 to resiliently urge the pressure plate 125 rearwardly, and the rearward movement is limited by bolt heads 130 which engage the blind ends of forward countersunk bores 131. When the heads 130 engage the ends of the bores 131, the rearward face of the pressure plate 125 is in the same plane as the rearward face of the cutter anvil 111, so that the terminal lugs 17 depending from the flexible strip 19 of the chain are supported by the pressure plate.

As the blade 97 moves forward on each cycle, the ends of the lands 100 engage the pressure plate 125 between the respective depending terminal lugs before the lugs are severed from the chain. Consequently, each lug is loosely confined in a rectangular area defined by the side of the respective lands, the cutting faces 98, and the opposed portions of the pressure plate, and the severed lugs must drop vertically downwardly from the respective confined areas. Thus, the severing assembly closely and accurately controls positioning, severing and dropping of a plurality of terminal lugs on each cycle of the machine.

*Terminal Lug Orientating Assembly*

Figure 9:
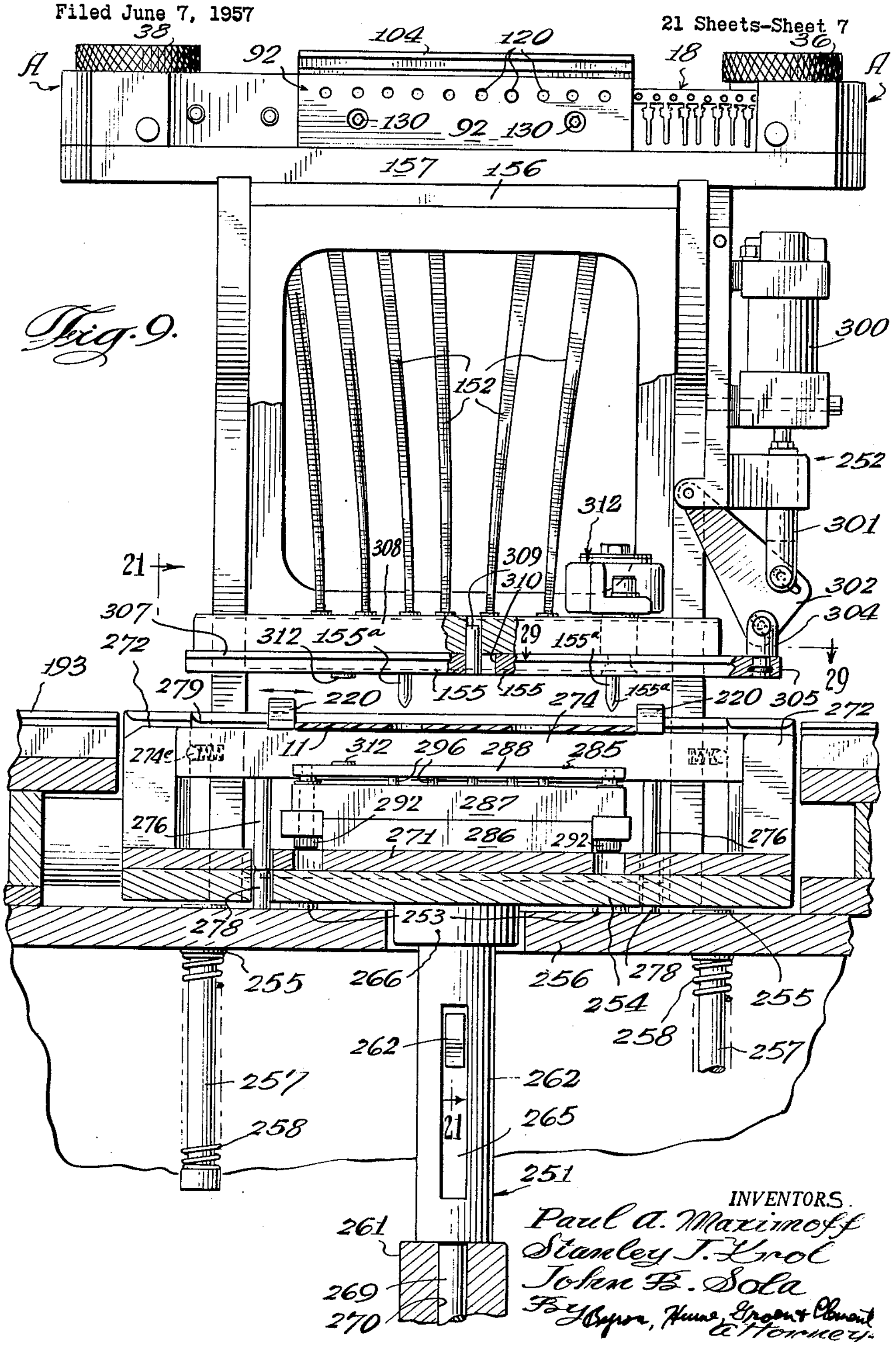
FIGURE 9 is an enlarged fragmentary front view of the machine showing the relationship between the terminal lug feeding and orientating assemblies and the board receiving assembly.

The orientating assembly C is generally shown in FIGURES 1 and 9 and specifically illustrated in FIGURES 10, 11, 16–20 and 23–26. The assembly includes a lug receiver block 150 having a plurality of lug receiving apertures 151, a plurality of terminal lug tubes or chutes 152, and a plurality of split terminal lug orientating bushings 154 secured in a bushing plate or master shuttle plate 155. The receiver block 150 receives the terminal lugs which are severed from the chain and directs the lug through the receiver apertures 151 to the chutes 152 where they are then directed to the orientating bushings 154. The orientating bushings are spaced in a preselected pattern for directing the lugs into the lug receiving apertures of the printed circuit boards.

The receiver block 150 is disposed directly below the terminal lugs as they hang from the flexible strip immediately prior to severing. The receiver block is fixedly secured in a plate 156 which in turn is fixedly secured below a base plate 157 which supports the severing assembly B. The apertures 151 are formed with upper countersunk portions 158 and lower, generally rectangular channel portions 159, with a smooth transition provided therebetween. The apertures are disposed in a row and spaced according to the spacing of the terminal lugs in the chain. To facilitate manufacture of the lug receiver block with its apertures, the block is formed in two halves as shown.

The row of apertures 151 is spaced sufficiently forward of the unsevered terminal lugs that the lugs are suspended above the rear margins of the upper countersunk portions of the apertures. Thus, when the shearing block 97 moves forward to shear off the terminal lugs and to move them forward, the lugs are dropped approximately at the centers of the respective apertures.

When severed, the lugs initially drop in a single plane. The lower portions 159 of the apertures are each formed at an angle of approximately 25° from this plane, so that the lugs are rotated this angular amount as they drop through the transition from the upper countersunk portions into the lower rectangular portions. The rectangular portions are angularly disposed as shown in order to permit close spacing of the lugs and the chutes. Otherwise it would be impossible to space the apertures close enough to correspond to the close spacing of the lugs on the chain, and furthermore, it would be impossible to connect the chutes 152 at the lower extremities of the apertures. Thus, by this simple expedient approximately half again as many lugs may be severed and directed to the terminal boards as would otherwise be possible in a single operation.

The chutes 152 are preferably formed of closely wound wire having a generally rectangular cross section, roughly equivalent to the cross section of the lower aperture portions 159 but having rounded ends. The wire coils provide an extremely flexible chute medium, readily permitting the directing of the individual lugs to the widely scattered positions corresponding to the spacing of the apertures in the printed circuit board. At the same time, the rectangular cross section of the chutes permits control over the angular disposition of the lugs so that when they are directed to the orientating bushings 154, they generally correspond to the various angular positions of the rectangular apertures in the printed circuit boards. Since the chutes are metallic, they offer very little frictional resistance to passage of the metallic lugs. Consequently, the lugs drop much faster than they would if the chutes were formed of plastic or the like, such as shown in Maximoff, Serial No. 525,144, filed July 29, 1955, referred to above.

The upper portions of the chutes are secured in respective apertures 160 formed in a chute securing plate 161 which is fixedly connected below the support plate 156. The apertures 160 are spaced immediately below the respective receiver block apertures 151, and they are provided with opposed vertical channels 164 which are formed and spaced to snugly receive and secure the upper portions of the chutes. The upper ends of the chutes are held in juxtaposition with the bottom of the receiver block 156 and the chutes are orientated at the same angle as the lower portions 159 of the apertures 151, so that the severed lugs will pass smoothly and without interference from the apertures of the receiver block into the chutes.

The orientating bushings 154 (best seen in FIGURES 23–26) are formed in two halves, as shown, to facilitate production. The outer configuration of each bushing includes a lower cylindrical portion 165 which is of reduced diameter with respect to an upper cylindrical portion 166. The lower portions of the bushings are secured in respective close fitting apertures 167 formed in the master shuttle plate 155. Internally each bushing is provided with an orientating cavity 168 having a cross sectional area at its top substantially the same as the outer cross sectional area of one of the tubes 152. Below this upper portion the cavity narrows to a depth slightly greater than the thickness of the terminal pins and to a width slightly greater than the widest portion of the terminal pins. Transition shoulders 169, for narrowing the depth, are formed somewhat above transition shoulders 170, for narrowing the width. This provides for exact angular orientation prior to final lateral orientation. The result is that the terminal pins are positively and exactly orientated when they reach the printed circuit board (as illustrated in FIGURE 52) and are deposited in the rectangular apertures in the board with no misses or delays, which would defeat the purpose of automation.

For securing the lower end portions of the chutes to the respective bushings, each half of each orientating bushing is provided with an upper ear 171. The pair of ears for each bushing defines an upper, reduced diameter cylinder with a vertical slot 172 formed through the center. Each slot 172 snugly receives the lower end portion of a chute 152. A close fitting split collar 174 is disposed firmly about the ears 171 of each bushing with the lower end portion of a chute 152 in place and with the lower end of the chute adjacent or abutting the upper edges of the shoulders 169.

The orientating assembly C is constructed for dispensing terminal lugs in any desired pattern, requiring only that the location of the orientating bushings correspond to the pattern of the apertures in the board. The number of terminal lugs in the pattern can be accommodated by setting the terminal lug feed assembly A to feed the required number of lugs with each cycle, within the limit of the maximum capacity of the machine.

*Printed Circuit Board Dispensing Assembly*

The board dispensing or "stacker" assembly D is best shown in FIGURES 1, 2 and 33–36. The assembly includes a pair of generally upright rearward board guide columns 190, a pair of generally upright forward board guide columns 191, a shiftable board feed rail 192, a stationary board receiving rail 193, a board support bar 194, and a double-throw pneumatic actuating cylinder 195. The various elements are supported on a base plate 196 which is fixedly secured to the machine frame.

Printed circuit boards 11 are stacked between the columns 190 and 191. The rear columns 190 have angular cross sections and the rear corners of the boards are confined by the respective legs. The forward columns 191 hold the boards in proper fore-and-aft position in conjunction with the rear columns. A large number of printed circuit boards can be stacked in the stacker assembly, limited only by the height of the columns 190 and 191. A weight 197 of any suitable type may be placed on top of the stack of boards to insure that they feed properly.

The bottom board in the stack has its forward edge portion resting on a ledge 198 of the feed rail 192 and its rearward edge portion resting on the support bar 194. A piston (not shown) in the actuating cylinder 195 has a rod 199 connected thereto and connected to the shift rail 192. The shift rail rides on a pair of guide tracks 200 and is shiftable fore-and-aft by actuation of the actuating cylinder 195 in timed sequence through the control apparatus H. The tracks 200 are fixedly mounted on the base plate 196.

The rearward board support columns 190 are mounted on a pair of bars 201 which are manually adjustably secured to the base plate 196 by means of adjustment blocks 202. The adjustment blocks are fixed to the forward ends of the bars and have portions (not shown) slidably disposed in transverse undercut slide-ways 203. The bars 201 are movable from side-to-side to adjust the columns 190 toward or away from one another to accommodate boards of different lengths. The columns may be slanted slightly forward, as illustrated. The bottom edge portions of the column ends are slightly more than one board thickness above the top face of the support bar 194 so that one board at a time, and only one, can be slipped under the columns.

The forward board support columns 191 are secured to a plate 204 which, in turn, is secured to a pair of adjustment blocks 205 adjustably connected to the base plate 196 through a pair of fore-and-aft undercut slideways 206 formed in the plate. Thus, the forward columns 191 and the plate 204 may be adjusted fore-and-aft with respect to the rearward columns 190 to accommodate different widths of printed circuit boards. A clearance of slightly more than one board thickness is provided between the bottom margins of the columns 191 and the step 198 of the shiftable feed bar 192.

The forward edge of the step 198 of the feed bar 192 is formed by a shoulder 207, the height of which is less than the thickness of a single board. As the feed rail 192 is shifted rearwardly by the actuating cylinder 195, one board is engaged and pushed rearwardly by the shoulder 207 until the rearward edge portion of the board rests on a step 209 of the stationary rail 193. The step 209 defines a shoulder 210 which limits the possible rearward movement of the board. As the board moves on to the shoulder 209 it actuates a micro-switch 211 (forming a portion of the control apparatus H) which energizes a board presence indicator and other automatic control devices in the control apparatus (not shown). Automatic operation of the machine is interrupted when the micro-switch 211 senses the absence of a printed circuit board at the proper interval in the sequence.

*Printed Circuit Board Transfer Assembly*

The board transfer assembly E is illustrated in FIGURES 1, 2, 4, 9, 21, 30, 31, 32 and 37. The assembly includes generally three board engaging fingers 220, a shiftable and rotatable transfer shaft 221, a piston rod 222 connected to the shaft and actuated by a double-acting pneumatic cylinder 224, transfer shaft rotating mechanism 225, and a double-acting pneumatic actuating cylinder 226 for operating the rotating mechanism.

The piston rod 222 is secured to a connector 227 which is also secured at the end of the transfer shaft 221, so that actuation of the cylinder 224 causes shifting of the piston rod 222, which in turn axially shifts the transfer shaft 221. The transfer shaft is shiftably supported at three positions by a support block 228 at one end of the cylinder 224, another support block 229, at the other end of the cylinder, and a third support block 230, which also serves to support a portion of the board repositioning assembly G.

The transfer shaft rotating mechanism 225 (FIGURES 4 and 5) includes a bracket 231 which is slidably keyed to the shaft 221. A piston rod 232 from the actuating cylinder 226 has an outer head portion 234 which is pinned to a radially outward portion of the bracket 231. Actuation of the cylinder 226 causes shifting of the rod 232 to rotate the bracket 231, and consequently the transfer shaft 221, through a limited range of rotation.

The board engaging fingers 220 are secured at their bases to an elongated key 235 which, in turn, is fixedly secured in a longitudinal groove 236 formed in the transfer shaft 221.

Figures 15, 21:
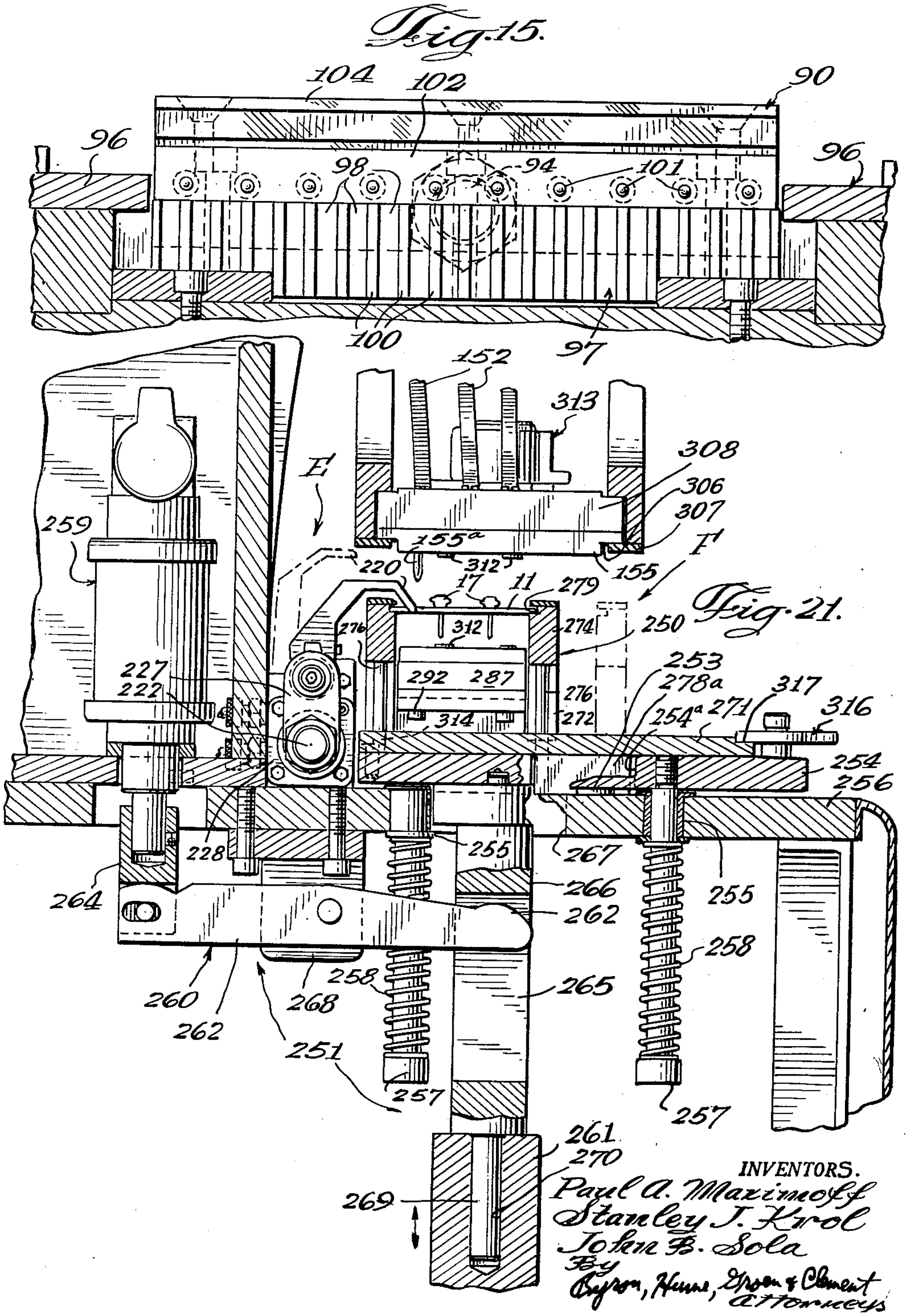
FIGURE 15 is a fragmentary sectional view taken along line 15—15 of FIGURE 10.
FIGURE 21 is a fragmentary sectional view taken along line 21—21 in FIGURE 9.
Figures 16, 17:
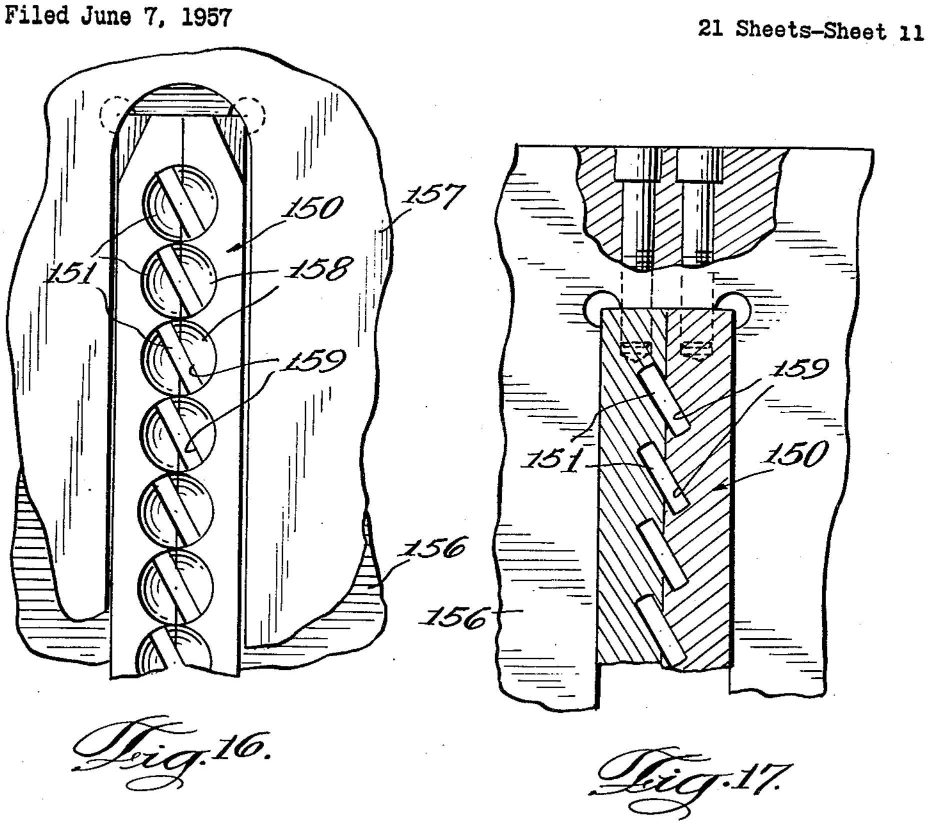
FIGURE 16 is a fragmentary elevational view taken along line 16—16 of FIGURE 11.
FIGURE 17 is a fragmentary sectional view taken along line 17—17 of FIGURE 11, but with the severed terminal lug removed.
Figures 18, 19, 20:
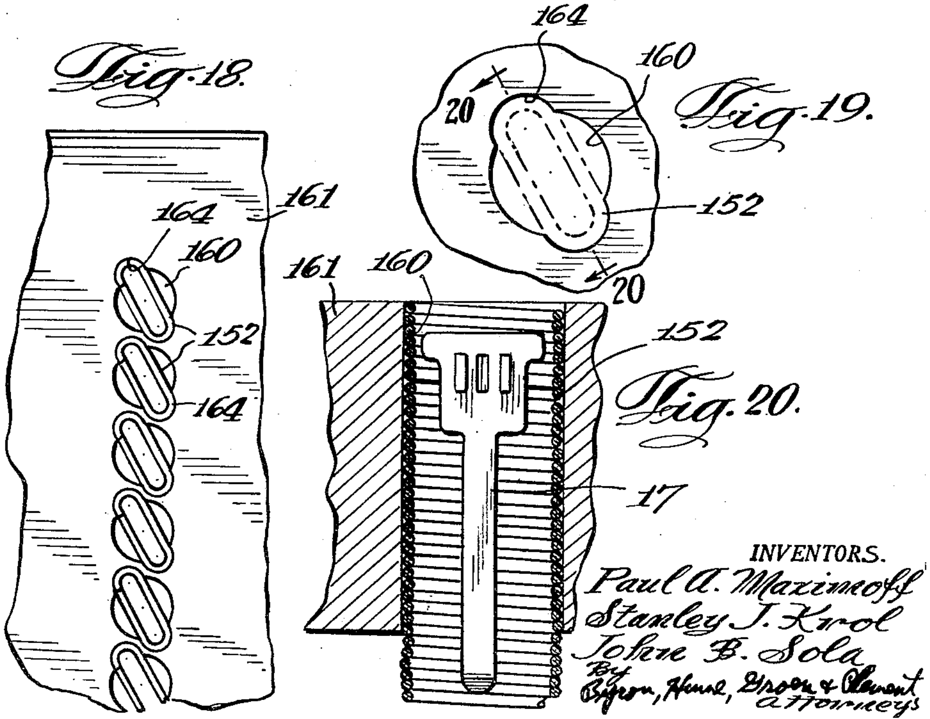
FIGURE 18 is a fragmentary elevational view taken along line 18—18 of FIGURE 11.
FIGURE 19 is an enlarged fragmentary elevational view of one of the lug receiving apertures shown in FIGURE 18 with a lug orientating chute secured therein.
FIGURE 20 is a fragmentary sectional view taken along line 20—20 of FIGURE 19 but showing a severed terminal lug dropping through the chute.

The middle board engaging finger 220 and the finger at the end toward the board dispensing assembly D are spaced on the key 235 so that they are adapted to engage the two ends of a printed circuit board 11. They are so located on the transfer shaft 221 that when the shaft is in its first or board pick-up position as shown in FIGURE 2, clockwise rotation of the shaft as seen in that figure will cause the fingers to engage the opposite ends of a printed circuit board on the rail 194. With the fingers in this position, the actuating cylinder 224 is energized to shift the transfer shaft 221 to its central or board manipulating position, carrying with it the fingers 220 and the board which is disposed therebetween. This position of the fingers and the board is illustrated in FIGURES 9 and 21.

Next, the actuating cylinder 226 is energized to rotate the transfer shaft 221 and to cause the fingers 220 to assume their upright position, disengaged from the board (as shown in solid lines in FIGURE 2 and in dash lines in FIGURES 5, 21, 31 and 32). With the fingers in this position the actuating cylinder 224 is again energized to shift the fingers back to the position shown in FIGURE 2.

The cycle is again started by energization of the actuating cylinder 226 to rotate the transfer shaft and to thereby move the fingers to their board engaging position where they engage another board at the stacker assembly D. At the same time the third finger 220 engages the end edge of the board which was initially placed in the central position in the board receiving assembly, as seen in FIGURES 9 and 21. Subsequent shifting of the actuating rod 221 moves a board from the board storing mechanism D to the central position and at the same time the third finger moves the first board to the repositioning assembly G. The first board is prevented from over travelling by an adjustable stop device 237 disposed on a support plate 238 connected to the machine frame. This cycle is repeated as long as the machine is operated, moving two boards at a time except for the movement of the initial board and the last board in any particular run.

*Printed Circuit Board Receiving Assembly*

The board receiving assembly F is generally shown in FIGURES 1 and 3, and is more specifically illustrated in FIGURES 9, 21, 22, 27, 28 and 29. The sequence of operation of this assembly is illustrated in FIGURES 47–57. The assembly includes a board receiver or "sandwich" mechanism 250, elevating mechanism 251 for raising and lowering the sandwich mechanism in timed sequence, and shuttle plate shifting mechanism 252.

The sandwich mechanism 250 is removably mounted on an elevator plate 254 which normally rests on stop pads 253 which are secured on top of a base plate 256 of the machine. Elongated bolts 257 are shiftably mounted in sleeves 255 which are vertically disposed through the base plate 256. At their upper ends the bolts 257 are threadedly secured to the elevator plate 254. Below the base plate 256 coil springs 258 are disposed about the shanks of the bolts 257 and act between the heads of the bolts and the lower ends of the sleeves 255. The springs act in conjunction with the gravtiy to normally hold the elevator plate 254 in its bottom position as illustrated in FIGURES 9 and 21.

The elevating mechanism 251 includes a pneumatic actuating cylinder or elevator cylinder 259, operating through lever mechanism 260, and a direct-acting pneumatic cylinder or super-speed cylinder (not shown), operating through a directly actuated piston rod 261.

The lever mechanism 260 includes an elevator arm 262 which is pivotally connected to the piston (not shown) of the cylinder 259 through a piston rod assembly 264. The other end of the elevator arm is engaged in a vertical slot 265 formed in an elevator pedestal 266. The pedestal 266 extends through an aperture 267 in the base 256 and is fixedly secured at its upper end to the elevator plate 254. The elevator arm is centrally pivoted to a bracket 268 which is fixedly secured to the base plate 256.

At its lower end the elevator pedestal 266 is provided with a reduced diameter end shank 269 which is fixedly secured in an axial socket 270 formed in the upper end of the super-speed cylinder rod 261.

The sandwich mechanism 250 is a self-contained assembly which is removably mounted on the elevator plate 254 below the terminal lug orientating assembly C. The mechanism includes a support plate 271 having two pairs of rail pedestals 272 fixedly secured thereto in upright position. A pair of rails 274 are disposed between the respective pairs of pedestals, and dovetail connection means 275 are provided on the sides of the pedestals and on the ends of the rails so that the rails are vertically shiftable with respect to the pedestals.

A pair of guide pins 276 is vertically connected to each of the rails and the lower ends of the pins extend freely into vertical clearance apertures 277 through the support plate 271. The lower ends of the guide pins 276 are flush with the lower surface of the support plate 271, so that the entire sandwich mechanism 250 can be removed and replaced without interference. Means are provided for maintaining the rails 274 in their normal, uppermost position and for moving the rails back to this position after they have been depressed. For the rear rail a pair of positioning pins or lugs 278 are fixedly secured to the base plate 256 immediately below the rearward guide pins 276. For the front rail a pair of elongated positioning bars or lugs 278*a* are fixedly secured to the base plate 256 immediately below the forward guide pins 276. The forward guide lugs 278*a* extend for a substantial fore-and-aft range so that they will engage the forward guide pins of any width of sandwich assembly which might be utilized. The positioning lugs 278 and 278*a* extend through appropriate clearance apertures 254*a* in the elevator plate 254, and the upper ends of the positioning lugs are flush with the top surface of the elevator plate 254. Thus, when the sandwich assembly is in its lowermost position, the ends of the positioning lugs 278 and 278*a* engage the lower ends of the guide pins 276 to move the rails 274 into their normal position.

In order to resiliently retain the rails in their normal position, each rail is provided at each end with a blind bore 274*a* containing a compression spring 274*b* resiliently urging a ball detent 274*c* into a positioning notch 272*a* formed in each of the rail pedestals 272. The positioning notches are located so that the ball detents 278c resiliently maintain the rails in their normal position when the sandwich is raised.

The rails and the rail pedestals are provided with horizontal, inwardly facing board receiving grooves or tracks 279 adjacent their upper edge portions. The tracks 279 in the rails and in the pedestals are normally aligned when the rails are in their uppermost positions. Each of the rail pedestals 272 is provided with a cap 280 which forms the upper defining edge of the groove 279 and at the same time provides a stop to limit upward movement of the rails 274 so that the rails are normally resiliently positioned as in FIGURES 9 and 27. The grooves 279 loosely retain the marginal edges of the printed circuit boards and provide tracks for the boards as they are moved by the transfer mechanism fingers 220.

Board clamping structure 285 is fixedly mounted on the mounting plate 271 and is centrally disposed between the rails. The clamping structure includes a base plate 286 with a staking bushing plate 287 fixed disposed thereon and a clamping plate 288 resiliently spaced above the staking plate. The base plate and the staking plate are connected to the support plate 271 by suitable bolts and dowel pins 289, as shown. The clamping plate is resiliently supported above the staking plate 287 by means of a plurality of cail compression springs 290 (one shown) which are disposed in vertical bores 291 formed through the staking plate and act between the base plate and the clamping plate.

The clamping plate is secured to the staking plate 287 by means of a plurality of bolts 292 which are threadedly secured to the clamping plate and are slidably mounted in close fitting apertures 294 formed vertically through the staking plate. Upward movement of the clamping plate is limited by the heads of the bolts 292, and clearance apertures 295 are formed in the support plate 271 to permit resilient downward movement of the clamping plate 288.

Hollow staking bushings 296 are fixedly secured in the staking plate 287 and extend through bushings 297 secured in the clamping plate 288. At their upper ends the staking bushings 296 are provided with inwardly tapered circular cutting edges 298. The cutting edges 298 are normally disposed slightly below the upper surface of the bushings 297. The staking bushings are axially aligned with the respective orientating bushings 154 secured in the shuttle plate 155, and there are a corresponding number of staking bushings.

The shuttle plate actuating mechanism 252 (FIGURES 1 and 9) includes a double-throw pneumatic cylinder 300 connected through a piston rod assembly 301 to a shuttle actuating plate 302 at an offset position. The actuating plate 302 is pivotally connected to the machine frame at one end and to an upright lug 304 at its other end and the lug 304 is fixedly secured to an integral tab 305 formed at one marginal edge of the shuttle plate 155. The shuttle plate is formed with undercut longitudinal grooves 306 (FIGURES 21 and 22) which are engaged by retainer strips 307 secured to a portion of the machine frame to hold the shuttle plate up against a support plate 308, which is secured to the machine frame. The undercut grooves 306 of the shuttle plate are formed of sufficient depth so that the shuttle plate is slidably mounted.

To positively limit the shifting movement of the shuttle plate dowel stop pins 309 are fixedly secured in the support plate 308 and are disposed in slots 310. The length of the slots 310 determines the maximum permissible shift of the shuttle plate. Clearance slots 311 are formed in the support plate 308 adjacent each of the orientating bushings 154 in order to permit shifting of the shuttle plate without interference between the bushings and the support plate. Because of the connection between the piston rod assembly 301 and the shuttle actuating plate 302 energization of the cylinder 300 causes shifting of the shuttle plate.

A vibrator 313 is secured to the support plate 308. The vibrator may be of any suitable construction and is energized by the control apparatus H as the terminal lugs are severed and dropped during each cycle to guard against sticking.

When a printed circuit board is moved by the board transfer mechanism E into position between the rails 274 of the sandwich mechanism 250, actuation of the pneumatic cylinder 259 causes the elevator arm 262 to move the pedestal 266 upwardly carrying with it the elevator plate 254 and the sandwich assembly. After the sandwich assembly has moved up a short distance, locating pins 155a secured to and depending from the shuttle plate 155 engage in suitable locating apertures in the printed circuit board to exactly locate the board with respect to the shuttle plate. The spring pressed detents 274c maintain the rails 274 in their normal position until they engage the retainer strips 307 on the machine frame. If a narrower sandwich mechanism 250 is being used as shown in FIGURE 21, the front rail 274 engages the shuttle plate 155. Thereafter, continued upward movement causes the rails to be depressed relative to the remainder of the sandwich assembly until the board is clamped between a plurality of opposed pairs of clamping pads 312 secured to the shuttle plate 155 and the clamping plate 288. This position is best illustrated in FIGURE 51.

After the severing assembly B has been actuated, terminal lugs 17 are directed by the orientating assembly C to the various apertures 15 in the printed circuit board, as illustrated in the next sequence of FIGURE 52. The elevator arm then drops the sandwich assembly a sufficient amount to clear the heads of the terminal lugs from the orientating bushings 154, as shown in the following sequence of FIGURE 53 (⅜ of an inch drop in actual model), and the shuttle plate actuating mechanism 252 is energized to move the shuttle plate 155 to one side the distance determined by the length of the slots 310 in the shuttle plate, FIGURE 54 (approximately ¼ of an inch in a working model).

Next, the super-speed cylinder is actuated to move the sandwich upwardly at a high rate of speed, first pushing the terminal lugs into place in the printed circuit board as illustrated in the next sequence of FIGURE 55. Continued upward movement causes the staking plate 287 to be moved against the compression of the springs 290 toward the clamping plate 288 to expose the staking bushings 296 so that they pierce the bottom marginal portions of the terminal lugs and spread the outer marginal portions outwardly, thus firmly staking the lugs in the printed circuit board as illustrated in FIGURE 56.

The sandwich 250 is then moved downwardly, as illustrated in the last sequence of FIGURE 57, and the transfer mechanism moves the board with staked lugs to the repositioning mechanism G and moves another board into place on the rails of the sandwich. As the elevator plate 254 is moved down, the guide pins 276 on the rails 274 engage the positioning lugs 278 and 278a, so that when the sandwich assembly reaches its bottom position, the rails 274 have moved back to their uppermost position, and the spring-pressed ball detents 274c snap into the detent notches 272a to resiliently retain the rails.

It is intended that the entire sandwich mechanism 250, or parts thereof, be replaceable to accommodate boards of different widths or having different patterns of lug receiving apertures.

Figures 22, 23, 24, 25, 26:
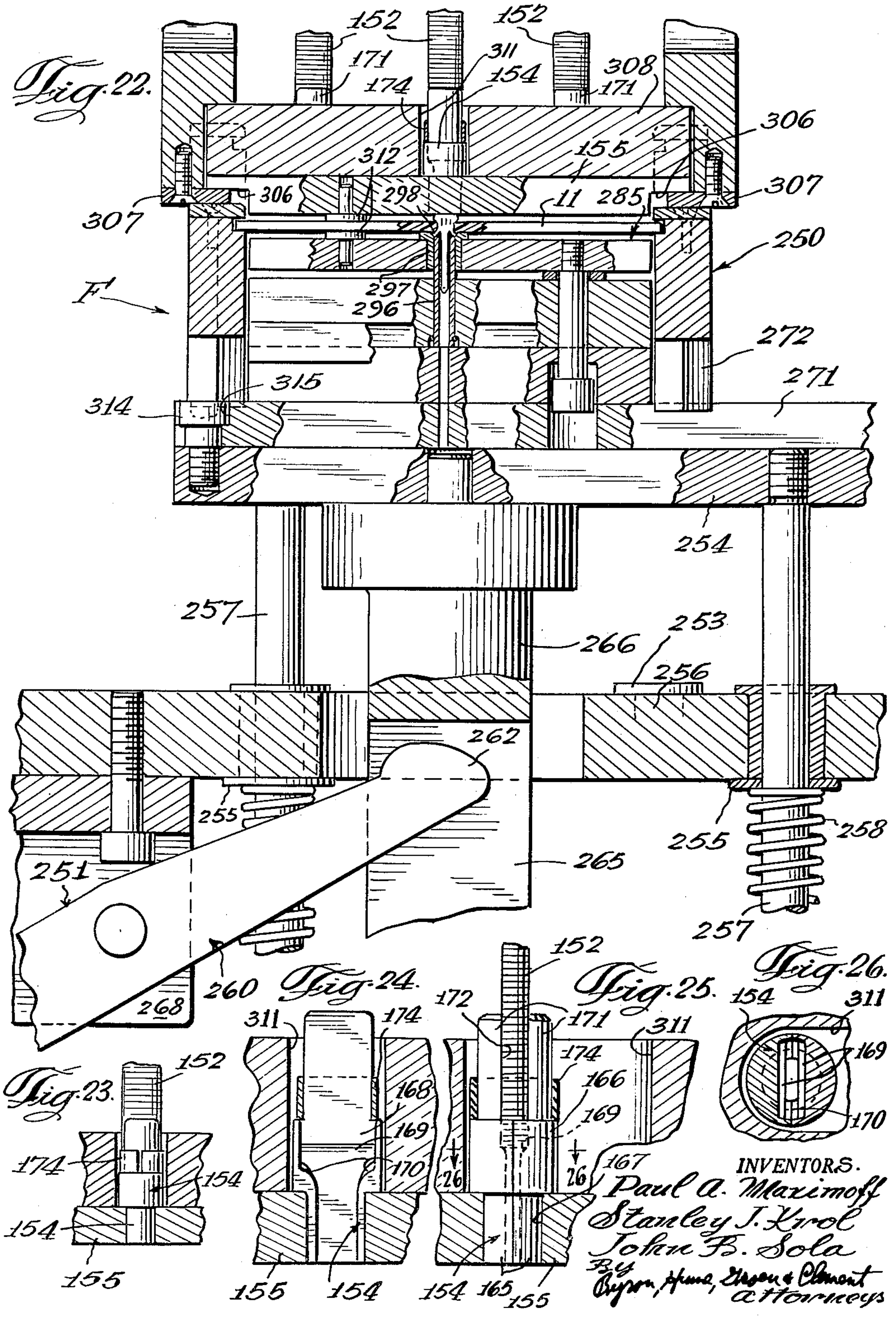
FIGURE 22 is an enlarged fragmentary sectional view similar to FIGURE 21 but showing the board receiving assembly in fully raised position.
FIGURE 23 is a fragmentary sectional view showing one of the terminal lug orientating bushings disposed in the shuttle plate.
FIGURE 24 is an enlarged fragmentary sectional view similar to FIGURE 23.
FIGURE 25 is an enlarged fragmentary sectionary view similar to FIGURE 24 but taken on a line rotated 90° with respect thereto.
FIGURE 26 is a fragmentary sectional view taken along line 26—26 of FIGURE 25.
Figures 27, 28, 29:
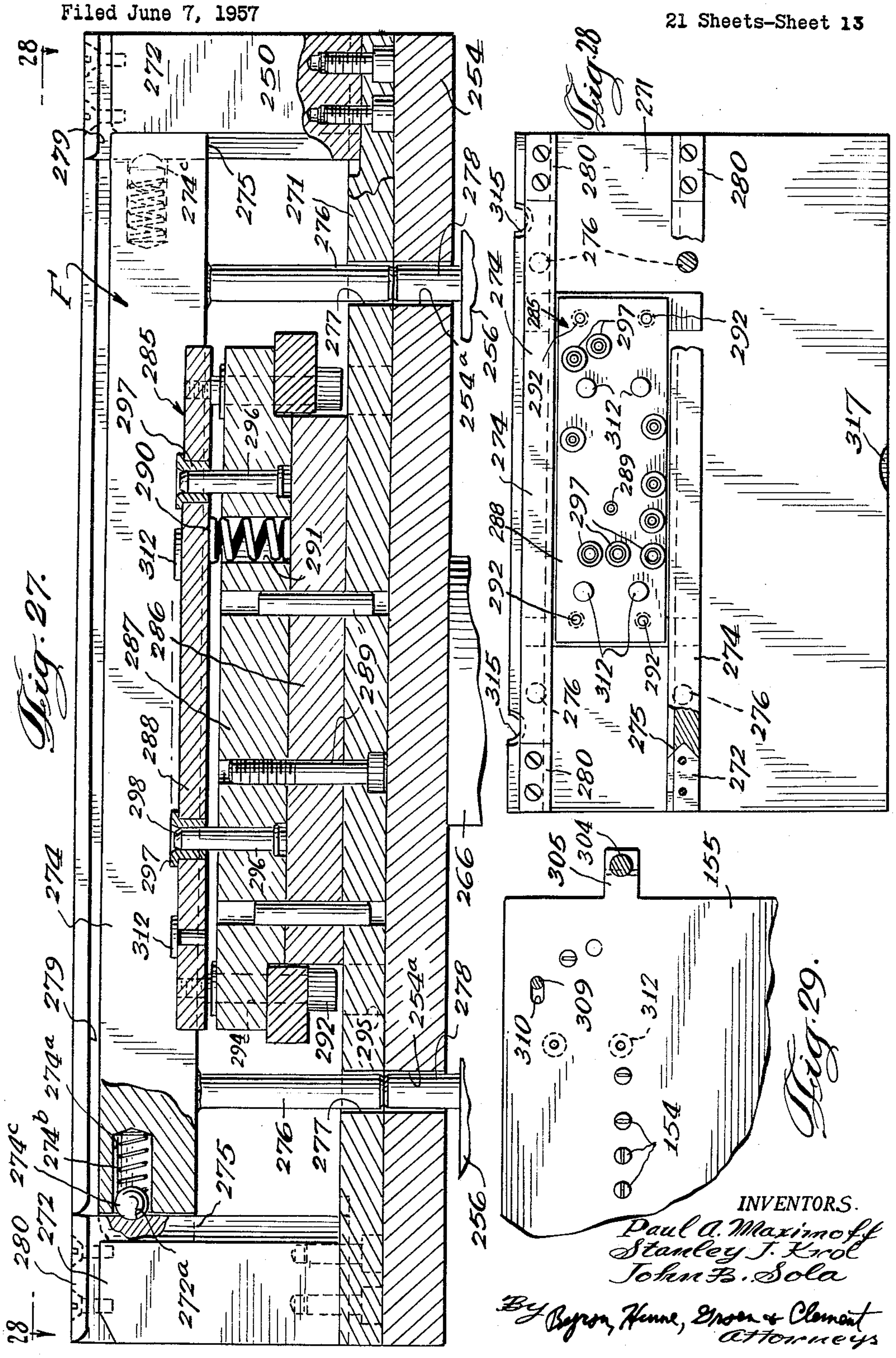
FIGURE 27 is an enlarged sectional view of the board receiving assembly.
FIGURE 28 is a reduced elevational view taken along line 28—28 of FIGURE 27.
FIGURE 29 is a fragmentary elevational view of the shuttle plate taken along line 29—29 of FIGURE 9.
Figures 30, 31, 32:
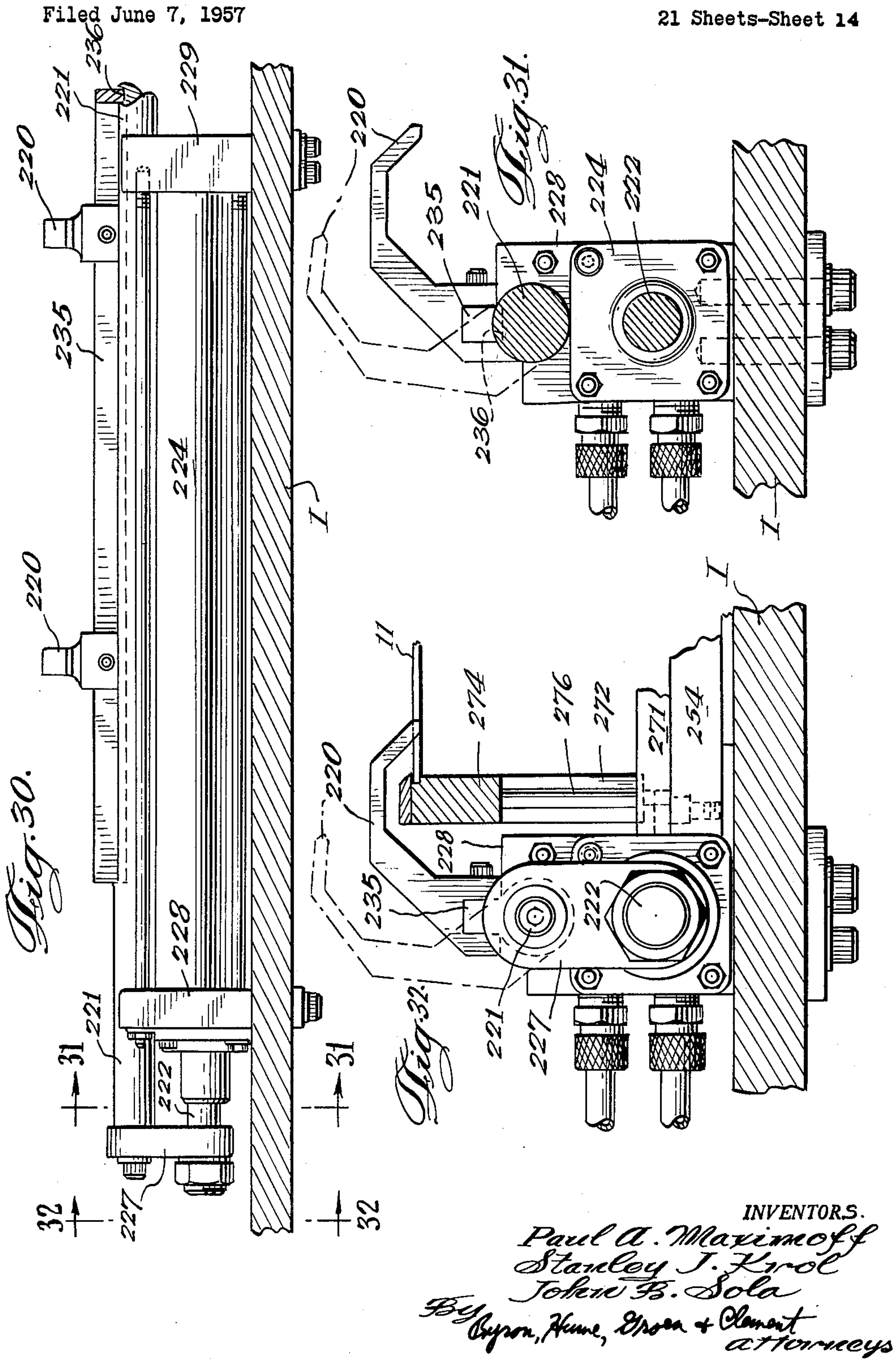
FIGURE 30 is a fragmentary elevational view of the printed circuit board transfer mechanism.
FIGURE 31 is an enlarged fragmentary sectional view taken along line 31—31 of FIGURE 30.
FIGURE 32 is an enlarged fragmentary sectional view taken along line 32—32 of FIGURE 30.
Figure 33:
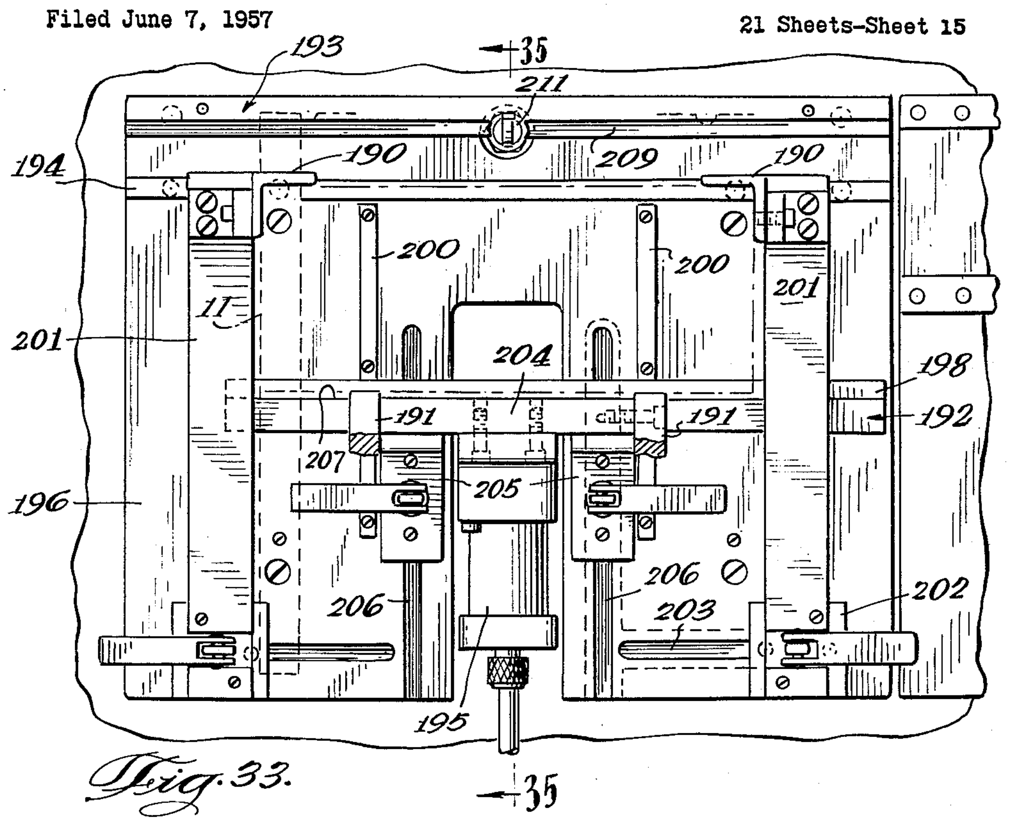
FIGURE 33 is a fragmentary top elevational view of the board storing and dispensing assembly.
Figure 34:
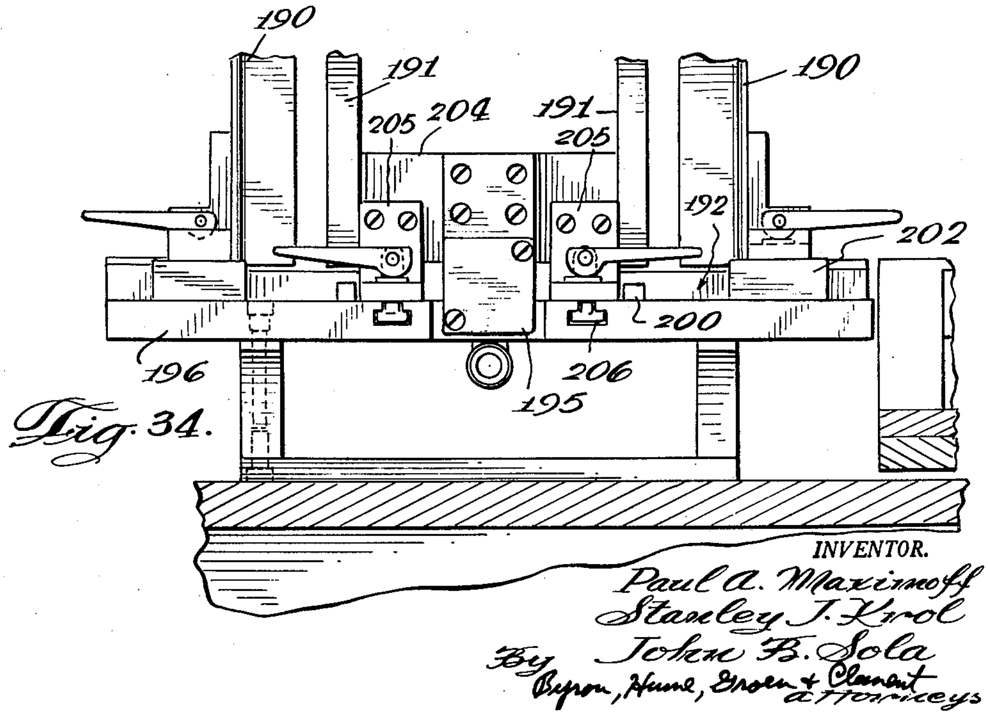
FIGURE 34 is a fragmentary side elevational view of the board storing assembly.
Figure 35:
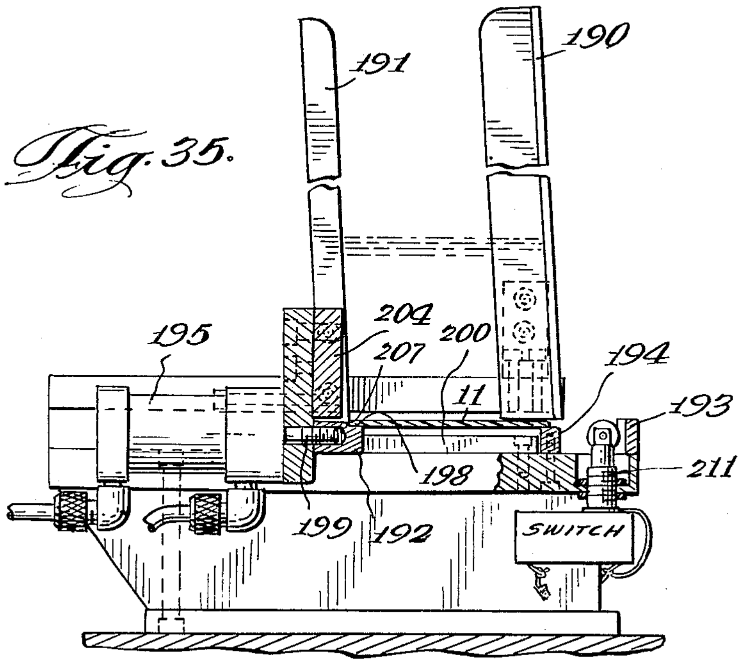
FIGURE 35 is a fragmentary sectional view taken along line 35—35 of FIGURE 33.
Figure 36:
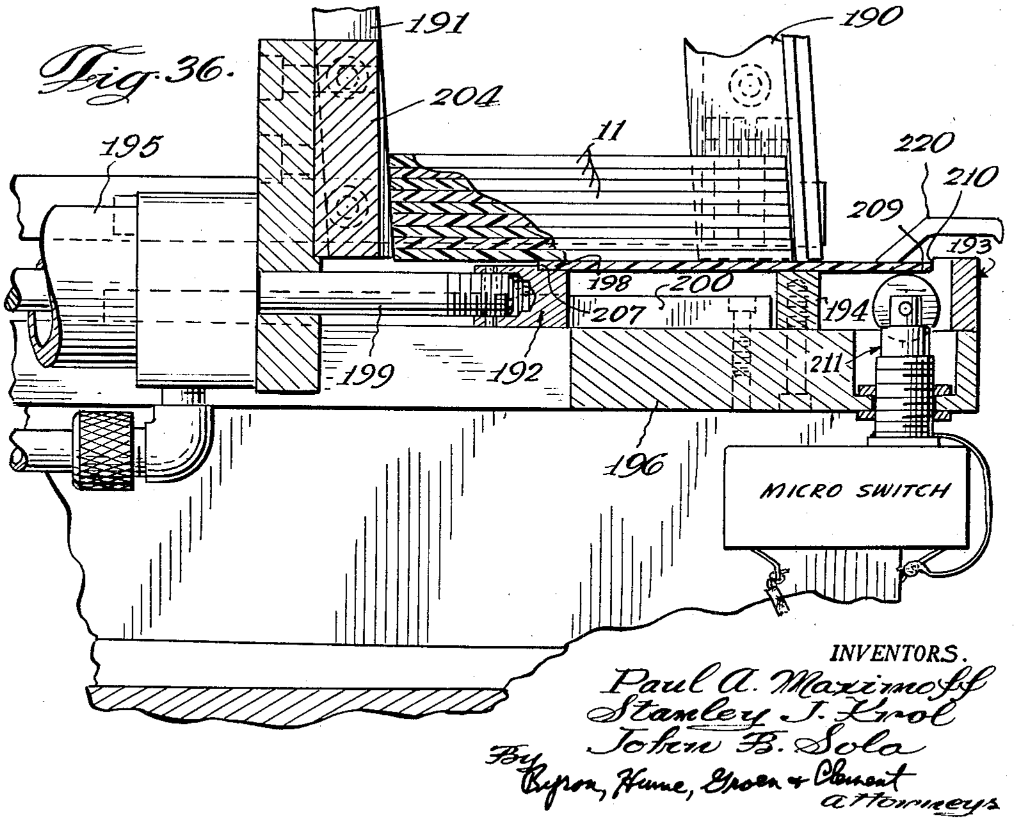
FIGURE 36 is an enlarged fragmentary sectional view similar to FIGURE 35 but with the board feed bar shown in a position after feeding one printed circuit board to the transfer assembly.

In order to properly position the sandwich assembly, locating studs 314, see FIGURE 22, are fixedly secured to the elevator plate 254 adjacent its rearward marginal edge, and mating notches 315, see FIGURES 22 and 28, are formed in the rearward marginal edge portion of the support plate 271. When the support plate is moved rearwardly until the notches 315 firmly engage the locating lugs 314, the sandwich assembly is exactly located in the machine. The sandwich assembly is removably secured in this position by means of a latch 316, see FIGURES 1 and 21, which is secured to the elevator plate 254 adjacent the front marginal edge. A portion of the latch is adapted to firmly engage in a notch 317, see FIGURES 21 and 28, formed on the upper forward marginal edge of the support plate 271 to firmly hold the support plate in its proper position.

*Printed Circuit Board Repositioning Mechanism*

The repositioning assembly G is generally shown in FIGURES 1 and 3 and more specifically illustrated in FIGURES 4 and 37–44. The assembly includes board gripper mechanism 330, turn-over mechanism 331, a pneumatic double-throw turn-over cylinder 332, board shift or pusher mechanism 334, and a double throw pneumatic pusher actuating cylinder 335.

The board gripper mechanism 330 is adapted to grip printed circuit boards which are moved from the rails 274 of the board receiving assembly F. The boards are moved over a pair of intermediate rails 336 which are secured to the plate 238. The front rail 336 is adjustable in and out to accommodate printed circuit boards of different widths.

The turn-over mechanism 331 includes a bifurcated arm 337 having a slide 338 slidably dovetailed between the two bifurcated ends of the arm 337. A frictional locking linkage 339 is provided for drawing the bifurcated ends of the arm 337 together to frictionally lock the slide 338 in any given position. At the end of the slide 338 a depending finger 340 is pivotally secured and is resiliently biased to the position shown in FIGURE 38 against a stop ledge 341 by means of a spring 342. A board receiving groove 344 is formed in the end of the finger 340 and another board receiving groove 345 is formed in the portion of the arm 337 opposite the groove 344.

Figure 37:
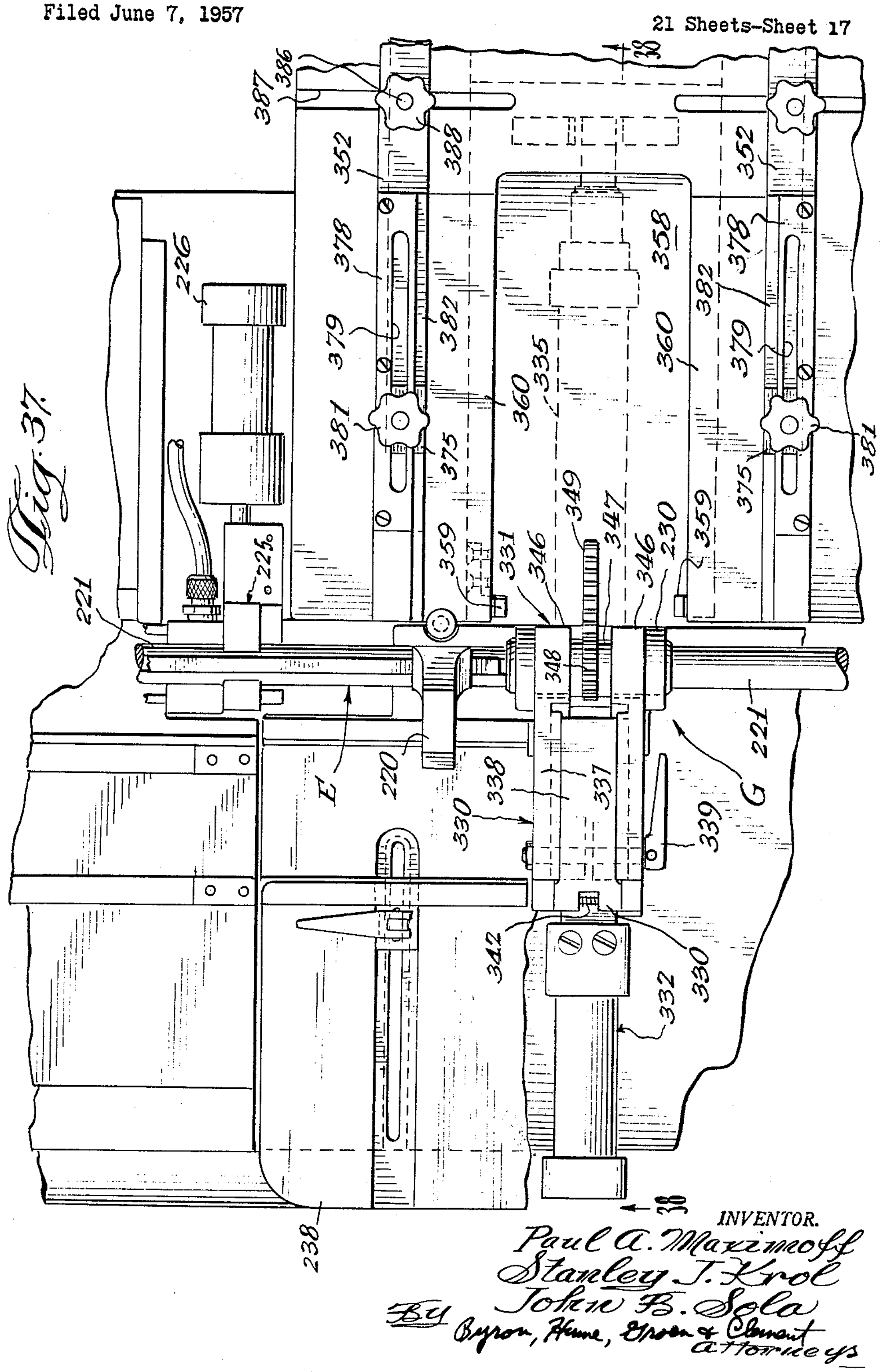
FIGURE 37 is an enlarged fragmentary top elevational view of the printed circuit board repositioning assembly.
Figures 38, 39, 40, 41, 44:
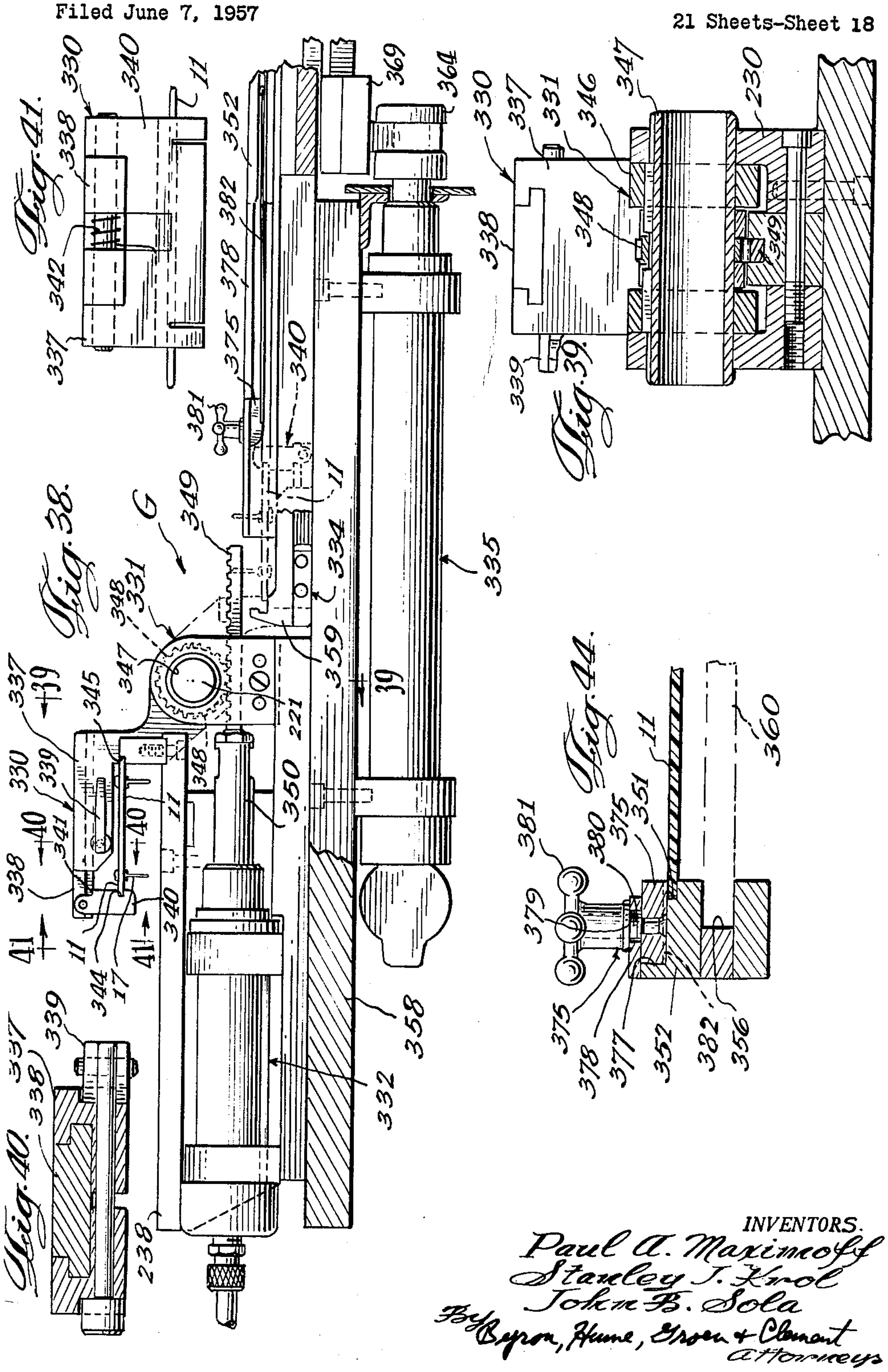
FIGURE 38 is an enlarged fragmentary side elevational view of the printed circuit board repositioning assembly.
FIGURE 39 is an enlarged fragmentary sectional view taken along line 39—39 of FIGURE 38.
FIGURE 40 is an enlarged sectional view taken along line 40—40 of FIGURE 38.
FIGURE 41 is an enlarged elevational view taken along line 41—41 of FIGURE 38.
FIGURE 44 is a fragmentary sectional view taken along line 44—44 of FIGURE 43.

When the gripper 330 is in the position shown in FIGURES 37 and 38, the grooves 344 and 345 are horizontally aligned with the board receiving grooves formed in the rails 274 and 336, so that the transfer finger 220 of the transfer assembly E can smoothly shift boards with staked terminal lugs from the rails 274 to the gripper mechanism 330.

In order to turn a printed circuit board completely over for the performance of additional operations, the turn-over mechanism 331 includes a pair of sleeve support arm portions 346, integrally formed with the arm 337, having a bearing sleeve 347 kyed therein and rotatably mounted in the support block 230. The transfer actuating shaft 221 is rotatably and shiftably supported within the sleeve. A pinion gear 348 is centrally keyed on the sleeve 347 between the two arm portions 346, and a gear rack 349 is shiftably supported and disposed below and in engagement with the teeth of the pinion 348. The rack 349 is fixedly secured to a piston rod 350 which is connected at its other end to the piston (not shown) of the cylinder 332. Actuation of the cylinder 332 acts through the turn-over mechanism 331 to shift the gripper mechanism 337 between its two positions 180° apart, as shown in FIGURE 38.

Figure 42:
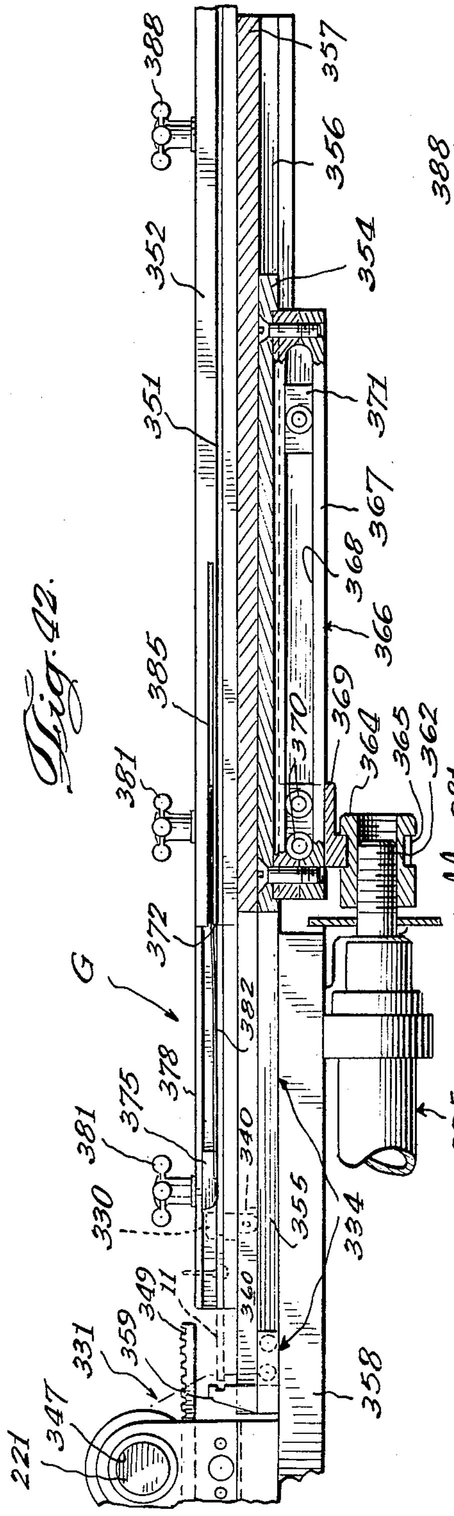
FIGURE 42 is an enlarged fragmentary side view similar to FIGURE 38 but showing rearward portion of the repositioning assembly.
Figure 43:
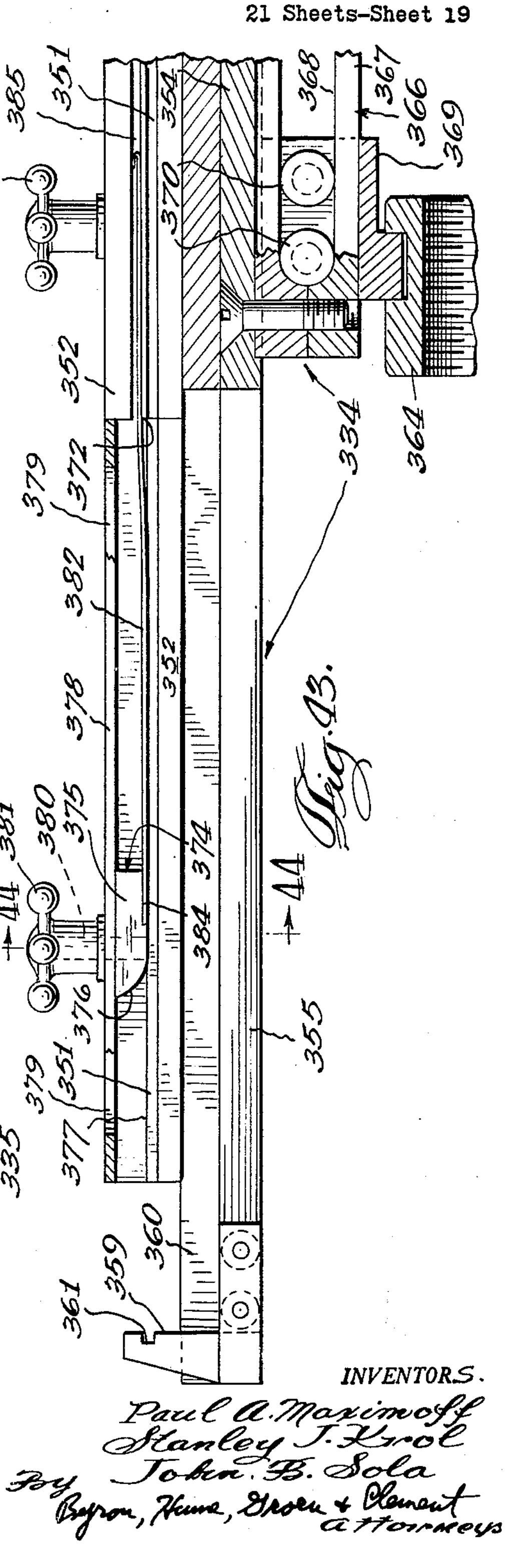
FIGURE 43 is a further enlarged view similar to FIGURE 42.

The pusher mechanism 334 is provided for disengaging overturned printed circuit boards from the gripper mechanism 330 when the mechanism is in the position shown in dotted lines in FIGURES 38 and 42. The pusher mechanism shifts the overturned boards rearwardly in board receiving grooves 351 of a pair of repositioning rails 352 through the medium of a shiftable pusher plate 354 having elongated, widely separated forwardly extending forked arms 355. The plate 354 has its marginal edges slidably supported in slide-ways 356 of a rear support plate 357. The arms 355 are slidably supported on a base plate 358. Upstanding board-pusher fingers 359 are fixedly secured at the ends of the pusher plate arms 355, and the fingers are inwardly offset toward each other to clear cover plates 360 which overlay the arms 355.

The upper end portions of the pusher fingers 359 are provided with rearwardly facing board engaging notches 361.

For actuating the pusher mechanism 334 the cylinder 335 has a piston rod 362 secured to the piston therein (not shown). An adjustable collar 364 is threadedly inserted over the end of the piston rod and has an annular groove 365 formed therein.

For providing an adjustable throw of the pusher mechanism while still utilizing a fixed throw of the piston rod, variable throw mechanism 366 forms the connection between the collar 364 and the pusher plate 354. The adjustable throw mechanism includes a longitudinal track 367 having a central longitudinal trackway 368 formed therein. The track 367 is fixedly secured to the pusher plate 354 on the lower side. A travelling block 369 is shiftably associated with the track 366 by means of a pair of rollers 370 which are rotatably secured to the travelling block and are rotatably mounted in the trackway 368. A stop block 371 is adjustably secured in the trackway 368 rearwardly of the travelling block 369, and the stop block may be fixedly secured at any desired position in the trackway.

When the cylinder 335 is energized to move the collar 364 rearwardly, the travelling block 369 moves freely along the track 367 without causing any movement of the pusher mechanism 334 until the travelling block engages the stop block 371. At this point, continued rearward movement of the travelling block causes rearward movement of the pusher plate 354 to move the pusher fingers 359 rearwardly, and the rearward movement continues until the piston reaches its rearmost position.

It will be seen that the throw of the pusher mechanism 334 is adjustable through adjustment of the position of the stop block 371. By moving the stop block further forward the throw of the pusher mechanism is increased. Rearward adjustment of the stop block decreases the throw. Thus, the throw adjusting mechanism 366 permits accommodation of considerable variation in the amount of movement of each successive board and in the width of boards to be processed on the machine of this invention.

When the pusher fingers 359 engage a printed circuit board in the position shown in dotted lines in FIGURES 38 and 42, rearward movement of the board causes the gripper finger 340 to be pivoted in a clockwise direction as seen in these figures against the bias of the spring 342. The grooves 351 of the tracks 352 are not closed to prevent upward movement of the board until the position 372 on the track is reached. To prevent such upward movement an adjustable brake mechanism 374 is provided.

The mechanism 374 includes a nose member 375 associated with each of the tracks and each having a rounded undercut 376 forming its leading edge. The nose members 375 are slidably disposed in a wide upper groove 377 formed along the top surface portion of the tracks 352 and extending back to the positions 372. Cover strips 378 are fitted over the pose members 375 and are fixedly secured to the portions of the tracks 352 forward of the position 372. The cover strips 378 are formed with longitudinal adjustment slots 379 each of which accommodates sliding adjustment of a threaded shaft 380 having a wing nut 381 threadedly secured thereon. By means of the wing nuts 381 the positions of the nose members 375 can be adjusted so that they just clear printed circuit boards which are moved onto the repositioning tracks 352 by the gripper mechanism 330. Thus, when the pusher fingers 359 move a printed circuit board rearwardly, the rounded undercut leading edge 376 of each of the nose members 375 engages the printed circuit board and prevents the board from being lifted as it moves rearwardly.

To guide the printed circuit board during its travel between the nose member 375 and the position 372 on the tracks, a flat spring 382 is fixedly secured at the lower surface of each of the nose members 375, rearwardly of the rounded nose 376. The nose members are appropriately undercut as shown at 384 to provide a smooth transition from the bottom surface of the nose portions to the bottom surface of the spring members. The spring members extend rearwardly into elongated grooves 385 formed over the grooves 351 and extending rearwardly far enough to allow substantial adjustment in the position of the nose members 375.

For adjusting the spread between the tracks 352 in order to accommodate printed circuit boards of various lengths, each of the tracks is mounted on a pair of bolts 386 having heads (not shown) adjustably mounted in under-cut grooves 387 formed in the plate 357. Wing nuts 388 are threadedly mounted on the upper ends of the bolt 386 to provide means for fixedly securing the tracks in any desired position within the range of adjustment.

*General Considerations*

The lug inserter machine of the present invention provides a completely automatic, continuously coordinated operation for handling printed circuit boards and flat type terminal lugs. The machine automatically provides finished or partly finished boards having lugs fixedly secured thereto and repositions the boards for further handling.

The printed circuit boards 11 are stored and fed by the stacker assembly D to the board transfer assembly E where they are engaged and moved by the transfer fingers to a position on the board receiving assembly F for insertion of terminal lugs. At the same time, the terminal lug feeding assembly A feeds a predetermined number of terminal lugs, depending from a chain 18, into the severing assembly B where the lugs are severed from the flexible strip of the chain and are dropped into the lug orientating assembly C. The orientating assembly dispenses the lugs in predetermined pattern and in predetermined positions to particular lug receiving apertures in the printed circuit board. The board receiving assembly then presses the lugs into place in the printed circuit board and permanently stakes them. Subsequently, the board transfer assembly removes the finished board to the repositioning mechanism G where the board, with fixedly secured lugs, is overturned and fed in another direction for further handling beyond the scope of this invention.

The operation of the machine is continuous until the supply boards or terminal lugs, or both, is exhausted. A complete cycle of operation for each board requires only about three seconds. Actuation of the various interacting parts of the machine is controlled in proper sequence by the control apparatus H acting through suitable servo-mechanisms, in the form of pneumatic cylinders for the most part.

For consideration of the detailed operation of each of the various interacting assemblies of the machine reference is made to the specific description of each major assembly.

The machine is constructed so that various sizes of printed circuit boards and various sizes of terminal lugs can be accommodated. In some instances the elements of the machine are adjustable and in other instances they are readily replaced by similar elements to accommodate various sizes.

From the foregoing description, it will be understood that the present invention relates to the overall construction and operation of a completely automatic machine for inserting and fixing terminal lugs in printed circuit boards and for handling the boards both before and after the insertion operation. In addition to the overall invention, it is submitted that several novel and patentable subcombinations are disclosed herein, as set forth in the claims.

Variations and modifications may be effected without departing from the scope of the novel concepts of the present invention.

We claim:

1. In a machine for dispensing and mounting pins or the like, means for intermittently feeding a flexible strip carrying a plurality of pins, comprising a spring-pressed pawl engaging said strip, means for intermittently shifting said pawl to pull said strip in one direction, and means for preventing engagement between said pawl and said flexible strip during a predetermined portion of movement of said pawl, whereby the length of strip fed with each shifting movement of said pawl in one direction is substantially equal to the length of movement of said pawl when in engagement with said strip.

2. In a machine for dispensing and mounting pins or the like, means for intermittently feeding a flexible strip carrying a plurality of pins, comprising a spring-pressed pawl engaging said strip, means for intermittently shifting said pawl to pull said strip in one direction, and a bar of predetermined length engaging said pawl for a portion of its movement to prevent engagement between the pawl and the flexible strip, whereby the length of strip fed with each shifting movement of said pawl in said one direction is substantially equal to the length of movement of said pawl less the length of said bar.

3. In a machine for dispensing and mounting pins or the like, means for severing a predetermined number of pins from a flexible strip carrying a plurality of pins, comprising a reciprocable cutter member having a plurality of cutting faces for engaging said pins, separators between said cutting faces, a stationary cutter anvil for coacting with said cutter member and restraining movement of said flexible strip as said pins are severed therefrom, and a spring-pressed pressure plate for engaging said separators as said cutter member moves toward said cutter anvil to confine said pins between said cutting faces and said pressure plate before said pins are severed from said flexible strip.

4. In a machine for dispensing and mounting a plurality of flat pins in rectangular holes in base members, means for feeding a flexible strip carrying a plurality of co-planar flat pins, means for severing a predetermined number of pins from said strip and for dropping the severed pins in substantially co-planar relation, a pin receiver block having a plurality of vertical apertures receiving the severed pins, said apertures having funnel-shaped upper portions and rectangular lower portions with smooth transition portions therebetween, the rectangular lower portions of said apertures being turned substantially from the plane of said pins before they are severed, whereby the severed pins are rotated out of the plane of the flexible strip as they drop through said apertures, and means for directing the pins from said apertures to the recangular holes in a base member.

5. In a machine for dispensing and mounting a plurality of flat pins in rectangular holes in base members, means for feeding a flexible strip carrying a plurality of flat pins, means for severing a predetermined number of pins from said strip and for dropping the severed pins, bushing means below said severing means and including a plurality of orientating bushings disposed above the respective rectangular holes in a base member, means for directing the severed pins to the respective orientating bushings, said orientating bushings each having a vertical aperture with an upper transition portion communicating with said pin directing means and a lower throat portion having a cross-sectional area only slightly larger than the largest cross-sectional area of said flat pins whereby a pin dropping through the throat portion of said aperture is exactly orientated with the corresponding hole in the base member.

6. In a machine for dispensing and mounting a plurality of flat pins in rectangular holes in base members, means for feeding a flexible strip carrying a plurality of flat pins, means for severing a predetermined number of pins from said strip and for dropping the severed pins, a pin receiver block having a plurality of vertical apertures receiving the severed pins, a plurality of flexible flat tubular members secured to said block below the respective apertures for receiving severed pins from the apertures, said tubular members being formed of relatively metallic wire coiled to form a flat tubular shape with the coils juxtaposed, and orientating means disposed below said receiver block for receiving pins from said tubular members and for directing the pins into the rectangular holes in a base member.

7. In a machine for dispensing and mounting a plurality of flat pins in rectangular holes in base members, means for feeding a flexible strip carrying a plurality of co-planar flat pins, means for severing a predetermined number of pins from said strip and for dropping the severed pins in substantially co-planar relation, a pin receiver block having a plurality of vertical apertures receiving the severed pins, said apertures having funnel-shaped upper portions and rectangular lower portions with smooth transition portions therebetween, the rectangular lower portions of said apertures being turned substantially from the plane of said pins before they are severed whereby the severed pins are rotated out of the plane of the flexible strip as they drop through said apertures, a plurality of flexible flat tubular members secured to said block below the respective apertures for receiving severed pins from the apertures, and bushing means below said block including a plurality of orientating bushings secured below the lower ends of the respective tubular members and disposed above the rectangular holes in a base member, said orientating bushings each having a vertical aperture with an upper transition portion leading from said tubular member and a lower throat portion having a cross-sectional area only slightly larger than the cross-sectional area of said flat pins, whereby a pin dropping through said throat portion is exactly orientated with the corresponding hole in the base member.

8. In a machine for dispensing and mounting a plurality of flat pins in rectangular holes in base members, means for feeding a flexible strip carrying a plurality of flat pins, means for severing a predetermined number of pins from said strip, orientating means below said severing means and including a plurality of orientating bushings disposed above the respective rectangular holes in a base member, means for directing the severed pins to said orientating bushings, said orientating bushings each having a vertical aperture with upper transition shoulders for first orientating a pin angularly, and lower transition shoulders for then orientating a pin laterally with respect to a rectangular hole in a base member.

9. In a machine for dispensing and mounting a plurality of pins or the like in mating holes in base members, means for feeding a flexible strip carrying a plurality of pins, means for severing a predetermined number of pins from said strip and for dropping the severed pins, base member receiving structure below said severing means and adapted for supporting a base member, orientating means below said severing means and above said receiving structure and including a bushing plate containing a plurality of orientating bushings disposed above the respective rectangular holes in the base members on the receiving structure, means for directing the severed pins to the respective orientating bushings whereby the pins are loosely disposed in the holes in the base member, means for shifting said receiving structure relative to said bushing means to dis-orientate the pins in the base member from the orientating bushings, and means for moving said support structure upwardly to engage said pins with said bushing plate to set the pins firmly in the mating holes.

10. In a machine for dispensing and mounting a plurality of pins or the like in mating holes in base members, receiving structure for base members including a support plate, a pair of rails vertically shiftably mounted on said support plate and having opposed longitudinal grooves formed therein for supporting a base member in parallel relation with said support plate, pin orientating structure disposed above said support structure and including means for directing pins to the respective apertures in a base member mounted on said receiving structure, staking means mounted on said support plate below the base member supported between said rails, and means for moving said support structure upwardly to engage said rails with said orientating structure to move said rails toward said support plate whereby said staking means engage with pins disposed in the holes to stake the pins in said holes.

11. In a machine for dispensing and mounting a plurality of pins or the like in base members, mechanism for shifting base members comprising rail means shiftably supporting base members, a base member transfer shaft, means for longitudinally shifting the shaft parallel to said rail means, means for circumferentially oscillating said shaft, and transfer fingers secured to said shaft and adapted for engaging base members, whereby base members are shifted by axially shifting said shaft with said fingers in engagement with the base members and whereby said shaft and said fingers may be shifted axially without moving base members by first circumferentially oscillating the shaft to disengage the fingers from the base members.

12. In a machine for dispensing and mounting a plurality of pins or the like in base members and including means for shifting base members and means for inserting and fixing pins in base members, mechanism for repositioning base members with pins fixed thereto comprising a base member gripper retaining one edge portion of a base member and having a spring-loaded arm adapted for resiliently retaining the opposite edge portion of the base member, means for rotating said gripper to overturn the base member retained thereby, and pusher mechanism adapted to shift the overturned base member way from said gripper against the spring bias of the gripper arm.

13. In a machine for dispensing and mounting a plurality of pins or the like in base members and including means for shifting the base members and means for inserting and fixing pins in the base members, mechanism for re-positioning base members with pins fixed thereto comprising a base member gripper having a central portion and a spring-loaded arm normally depending from said central portion, said central portion and said spring loaded arm having opposed grooves for resiliently retaining the opposite edge portions of a base member, means for rotating said gripper to overturn the base member retained thereby, a pair of tracks adapted for receiving the overturned base member, pusher mechanism adapted for engaging the overturned base member to move the base member away from said gripper against the spring bias of the gripper arm, and keeper elements operatively associated with said tracks for retaining the base member on the tracks as the pusher mechanism moves the base member past the gripper arm.

14. In a machine for dispensing and mounting a plurality of pins or the like in base members, storage mechanism for retaining a plurality of base members in a stack and for moving successive bottom base members out of line of the stack, base member receiving means for receiving successive base members, pin mechanism for delivering and mounting a predetermined number of pins to successive base members in said receiving means, pin securing means for moving said receiving means toward said pin mechanism and for securing the pins mounted in successive base members, a base member transfer shaft having first and second transfer fingers secured thereto in spaced relation whereby said first transfer finger is engageable with successive bottom base members when moved out of line of said stack and said second transfer finger is simultaneously engageable with successive base members in said receiving means, actuating means for actuating said storage mechanism and said pin mechanism substantially simultaneously and for shifting said transfer shaft with said transfer fingers engaged alternately with said mechanisms to shift base members when said mechanisms are unactuated, and oscillating means for circumferentially oscillating said transfer shaft to move said transfer fingers free of said mechanisms when actuated.

15. In a machine for dispensing and mounting a plurality of pins or the like in base members, storage mechanism for retaining a plurality of base members in a stack and for moving successive bottom base members out of line of the stack, base member receiving means for receiving successive base members, pin mechanism for delivering and mounting a predetermined number of pins to successive base members in said receiving means, transfer means including a first transfer finger engageable with successive bottom base members when moved out of line of said stack and a second transfer finger simultaneously engageable with successive base members in said receiving means for shifting the base member engaged by said first transfer finger to said receiving means and the base member engaged by said second transfer finger away from said receiving means, and actuating means for actuating said storage mechanism and said pin mechanism substantially simultaneously and for actuating said transfer means alternately with said mechanisms to shift base members when said mechanisms are unactuated and to move said transfer fingers free of said mechanisms when actuated.

16. In a machine for dispensing and mounting a plurality of pins or the like in base members, storage mechanism for retaining a plurality of base members in a stack and for moving successive bottom base members out of line of the stack, base member receiving means for receiving successive base members, pin mechanism for delivering and mounting a predetermined number of pins to successive base members in said receiving means, transfer means engageable with successive bottom base members when moved out of line of said stack and simultaneously engageable with successive base members in said receiving means for shifting the base member from said stack to said receiving means and the other base member away from said receiving means, and actuating means for actuating said storage mechanism and said pin mechanism substantially simultaneously and for actuating said transfer means alternately with said mechanisms to shift base members only when said mechanisms are unactuated.

17. In a machine for dispensing and mounting a plurality of pins or the like in base members, mechanism for transferring base members comprising means shiftably supporting base members in spaced relation, spaced transfer fingers adapted for engaging base members disposed on said support means, means for simultaneously shifting said transfer fingers to shift engaged base members on said support means in one direction, and means for simultaneously moving said fingers generally at right angles to said one direction of movement to disengage said fingers from said base members before said fingers are shifted in the direction opposite to said one direction.

18. In a machine for dispensing and mounting a plurality of pins or the like in base members, transfer mechanism for transferring base members comprising rail means shiftably supporting opposite longitudinal edge portions of the base members with a plurality of base members disposed in longitudinally spaced relation, a base member transfer shaft having a plurality of transfer fingers secured thereto in longitudinally spaced relation whereby said fingers are engageable with successive base members on said rail means, shift means for longitudinally shifting said shaft with transfer fingers engaging said base members to simultaneously shift the base members a predetermined distance in one direction along said rail means, engagement means for simultaneously moving said transfer fingers laterally with respect to said one direction of movement to disengage said fingers from said base members at the end of said distance, said shift means being adapted to thereafter shift said fingers said predetermined distance in the direction opposite to said one direction, and said engagement means being adapted to thereafter laterally shift said fingers into engagement with the respective base members behind the previously engaged base members.

19. In apparatus for mounting electrical components, such as connector lugs, in apertures of circuit panels, a plate system consisting of three horizontal plate units, generally overlying one another and comprising: an upper plate, horizontally movable to slightly different positions, said plate having insertion ports vertically extending through the plate and located in a pattern similar to that of the panel apertures; an intermediate, vertically movable plate, having alignment ports vertically extending through the latter plate and located in a pattern similar to that of the panel apertures, said plates having means for receiving and holding one of said panels with the panel apertures and the plate alignment ports in registry so that in an insertion position of the plate system, with the intermediate plate raised and the upper plate in one of its positions, registered and continuous apertures extend through the upper plate, the panel and the intermediate plate for insertion of components into positions extending from said insertion ports, through the panel, into said alignment ports; a lower, vertically movable plate having punch elements secured thereto, upstanding therefrom and vertically slidable in the alignment ports of the intermediate plate, for staking engagement with the undersides of components inserted in the panel; means for effecting cycles of horizontal reciprocating motions of said upper plate to said different positions and coordinated vertical reciprocating motions of said lower and intermediate plates, each cycle including initial upward motion of the lower and intermediate plates, with a panel thereon, to establish said insertion position, subsequent downward motion of the lower and intermediate plates with the panel and inserted components, followed by horizontal motion of the upper plate to register the components, and the punch elements for staking them, with unported areas of the upper plate adapted to bear against the components, and renewed upward motion of the intermediate and lower plates, with the panel and inserted components, for said staking engagement; and flexible connector means, enabling and forcing the punch elements on the lower plate upwardly to override the intermediate plate, toward the panel, in the establishment of said staking engagement.

20. Apparatus as described in claim 19, wherein the last mentioned connector means includes resilient means bearing against upper surfaces of the lower plate and against lower surfaces of the intermediate plate, so as to yieldingly, vertically spread said two plates apart, whereby the means for effecting coordinated vertical motions is adapted to effect all of the vertical motions in the plate system, including the initial and renewed upward motions and said upward overriding, by means of linkage manipulating the lower plate.

21. Apparatus as described in claim 19 additionally including a lug feeder above the plate system and a series of flexible lug guides, all leading downwardly from the lug feeder and each leading to one of the insertion ports.

22. Apparatus for mounting electrical wire connector lugs on circuit panels, comprising: a lower vertical movable plate unit, including first and second horizontal plates, the first overlying the second; an upper, horizontal plate, generally overlying the lower plate unit, horizontally movable to and between two different positions and having lug insertion ports vertically extending through the upper plate and adapted to be registered with lug insertion holes in the panels for insertion of lugs, through said ports, into said holes; said first plate of the lower plate unit having vertically extending alignment ports and being arranged to receive one of said panels on said first plate, with the panel holes and alignment holes in registry; said second plate having punch elements secured thereto, upstanding therefrom and vertically slidable in the alignment ports of the intermediate plate, for staking engagement with the undersides of lugs, inserted in the corresponding panel holes; means in said lower plate unit for resiliently supporting the first plate thereof from the second plate thereof; and means effecting successive, horizontal motions of said upper plate to said different positions and effecting upward and downward motions of said second plate after each of said horizontal motions, whereby one of the motions of the second plate adapts the apparatus to said insertion of lugs and the next of said upward motions of the second plate, with the punch elements thereon, effects staking of the inserted lugs to the panel.

23. Apparatus as described in claim 22, additionally including flexible lug insertion guides, extending from the insertion ports of the upper plate to an overlying, stationary lug feeder device, and, in each of said guides, a pair of lug orientating posts, mounted in and upstanding from the insertion port, said posts having surfaces disposed one above the other and inclined in planes intersecting one another, while said ports have horizontally spaced side surfaces facing one another.

References Cited in the file of this patent

UNITED STATES PATENTS

| | | |
|---|---|---|
| 356,553 | Raymond | Jan. 25, 1887 |
| 383,911 | Raymond | June 5, 1888 |
| 1,239,819 | Peters et al. | Sept. 11, 1917 |
| 2,346,293 | Croy | Apr. 11, 1944 |
| 2,489,404 | Davis | Nov. 29, 1949 |
| 2,567,819 | Matteson et al. | Sept. 11, 1951 |
| 2,594,840 | Allison | Apr. 29, 1952 |
| 2,772,416 | Dorosz | Dec. 4, 1956 |
| 2,781,144 | Allison | Feb. 12, 1957 |
| 2,814,802 | Maximoff | Dec. 3, 1957 |